US012654440B2

(12) United States Patent
Ide et al.

(10) Patent No.: US 12,654,440 B2
(45) Date of Patent: Jun. 16, 2026

(54) SYSTEM, AND NON-TRANSITORY STORAGE MEDIUM STORING SERVER PROGRAM OR CLIENT PROGRAM

(71) Applicant: SEIKO EPSON CORPORATION, Tokyo (JP)

(72) Inventors: Noritaka Ide, Shiojiri (JP); Kunio Tabata, Shiojiri (JP); Rika Tanimoto, Matsumoto (JP); Yukihiro Hanaoka, Shiojiri (JP); Nobuaki Ito, Shiojiri (JP); Naoki Yamazaki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 490 days.

(21) Appl. No.: 18/184,498

(22) Filed: Mar. 15, 2023

(65) Prior Publication Data

US 2023/0294397 A1     Sep. 21, 2023

(30) Foreign Application Priority Data

Mar. 16, 2022   (JP) ................................. 2022-041037

(51) Int. Cl.
B41J 2/045 (2006.01)
G06F 3/12 (2006.01)
B41J 2/14 (2006.01)

(52) U.S. Cl.
CPC ....... B41J 2/04541 (2013.01); B41J 2/04506 (2013.01); B41J 2/04581 (2013.01); G06F 3/1285 (2013.01); B41J 2/14233 (2013.01);

*B41J 2002/14419* (2013.01); *B41J 2202/11* (2013.01); *B41J 2202/12* (2013.01)

(58) Field of Classification Search
CPC ................ B41J 2/04541; B41J 2/04506; B41J 2/04581; B41J 2/14233; B41J 2002/14419; B41J 2202/11; B41J 2202/12; G06F 3/1285
See application file for complete search history.

(56) References Cited

U.S. PATENT DOCUMENTS

2002/0041386 A1 *   4/2002   Suzuki .............. H04N 1/00411
                                                           358/1.13
2021/0060939 A1      3/2021   Kanegae et al.

FOREIGN PATENT DOCUMENTS

| CN | 108944034 A | * 12/2018 | ................ B41J 2/01 |
| JP | 2020093468 | 6/2020 | |
| JP | 2021-030689 A | 3/2021 | |

* cited by examiner

*Primary Examiner* — Yaovi M Ameh
(74) *Attorney, Agent, or Firm* — WORKMAN NYDEGGER

(57) ABSTRACT

A system includes a characteristics acquirer, a selector, and a notifier. The characteristics acquirer acquires pieces of ejection characteristics information regarding ejection characteristics of a plurality of heads different from one another. The selector selects a first liquid ejecting head from among the plurality of heads based on the pieces of ejection characteristics information. The notifier notifies a user of information regarding the first liquid ejecting head.

15 Claims, 17 Drawing Sheets

SYSTEM, AND NON-TRANSITORY STORAGE MEDIUM STORING SERVER PROGRAM OR CLIENT PROGRAM

The present application is based on, and claims priority from JP Application Serial Number 2022-041037, filed Mar. 16, 2022, the disclosure of which is hereby incorporated by reference herein in its entirety.

BACKGROUND

1. Technical Field

Embodiments of the present disclosure relate to a system capable of presenting one that is suitable for a user's use environment from among various kinds of liquid ejecting head, and relate to a non-transitory storage medium storing a server program or a client program for it.

2. Related Art

In an ink-jet recording head as an example of a liquid ejecting head, for example, piezoelectric actuators are provided over one surface of a flow passage forming substrate in which pressure compartments in communication with nozzles are formed, and a diaphragm is deformed by driving the piezoelectric actuators to cause pressure changes in ink present inside the pressure compartments, thereby ejecting ink droplets from the nozzles. An example of such an ink-jet recording head is disclosed in JP-A-2021-030689.

Conventionally, it has been a mainstream for printer manufacturers to develop liquid ejecting heads and sell printers as finished products. By contrast, these days, there exists a business model in which a head manufacturer develops a liquid ejecting head and sells it to a user (printer integrator) and then the user manufactures and sells a printer (head outsourcing).

In this business model, there has been the following problem. A user purchases a certain liquid ejecting head and actually built it in a printer, ending up finding that, depending on ink and/or a medium which the user uses and/or the user's ambient conditions, desirable conditions cannot be obtained even though the waveform of a drive signal applied to the liquid ejecting head has been changed, and thus the printer specifications demanded by the user cannot be satisfactorily met.

If a process of the user getting in contact with the head manufacturer and of the head manufacturer supplying another type of head to the user is repeated when such a problem occurs, it will take a lot of time and trouble to find a liquid ejecting head that satisfies the conditions demanded by the user, though possible.

SUMMARY

An advantage of some aspects of the present disclosure is to provide a system that makes it possible to provide an appropriate liquid ejecting head to a user without burdening the user, and a non-transitory storage medium storing a server program or a client program for it.

A system according to a certain aspect of the present disclosure includes: a characteristics acquirer that acquires pieces of ejection characteristics information regarding ejection characteristics of a plurality of liquid ejecting heads different from one another; a selector that selects a first liquid ejecting head from among the plurality of liquid ejecting heads based on the pieces of ejection characteristics information, and a notifier that notifies a user of information regarding the first liquid ejecting head.

Another aspect of the present disclosure is a non-transitory storage medium storing a server program configured to cause a server to operate as a selector, the server being configured to communicate with an external device for communication of pieces of ejection characteristics information regarding ejection characteristics of a plurality of liquid ejecting heads different from one another, the selector being configured to select a first liquid ejecting head from among the plurality of liquid ejecting heads based on the pieces of ejection characteristics information acquired from the external device.

Still another aspect of the present disclosure is a non-transitory storage medium storing a client program configured to cause an external device to operate as a characteristics transmitter and a notifier, the external device being configured to communicate with an experiment device and a server, a plurality of liquid ejecting heads different from one another being configured to be coupled to the experiment device, the external device being configured to acquire pieces of ejection characteristics information regarding ejection characteristics of the plurality of liquid ejecting heads, the server being configured to select a first liquid ejecting head from among the plurality of liquid ejecting heads, the characteristics transmitter being configured to transmit the pieces of ejection characteristics information acquired from the experiment device to the server, the notifier being configured to notify a user of information acquired from the server regarding the first liquid ejecting head.

BRIEF DESCRIPTION OF THE DRAWINGS

FIG. 4 is a cross-sectional view taken along the line IV-IV of FIG. 3.

FIG. 9 is a cross-sectional view of the another head taken in parallel with an X-Z plane in such a way as to go through a circulation flow passage.

FIG. 10 is a cross-sectional view of the another head taken in parallel with an X-Z plane in such a way as to go through another circulation flow passage.

DESCRIPTION OF EXEMPLARY EMBODIMENTS

Based on an exemplary embodiment, a detailed description of the present disclosure will be given below. The description below merely shows a certain aspect of the present disclosure. As such, the described aspect may be modified as needed within the scope of the present disclosure.

First Embodiment

Figure 1:
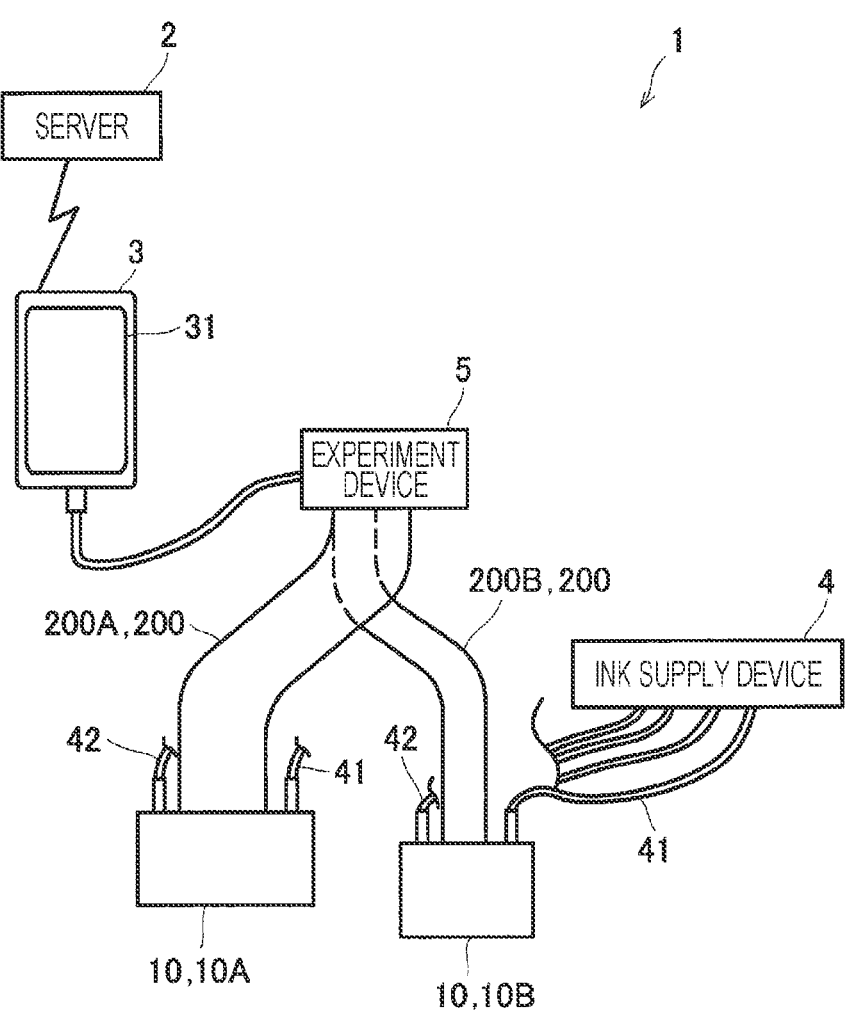
FIG. 1 is a diagram illustrating a configuration of a system according to a first embodiment.
Figure 2:
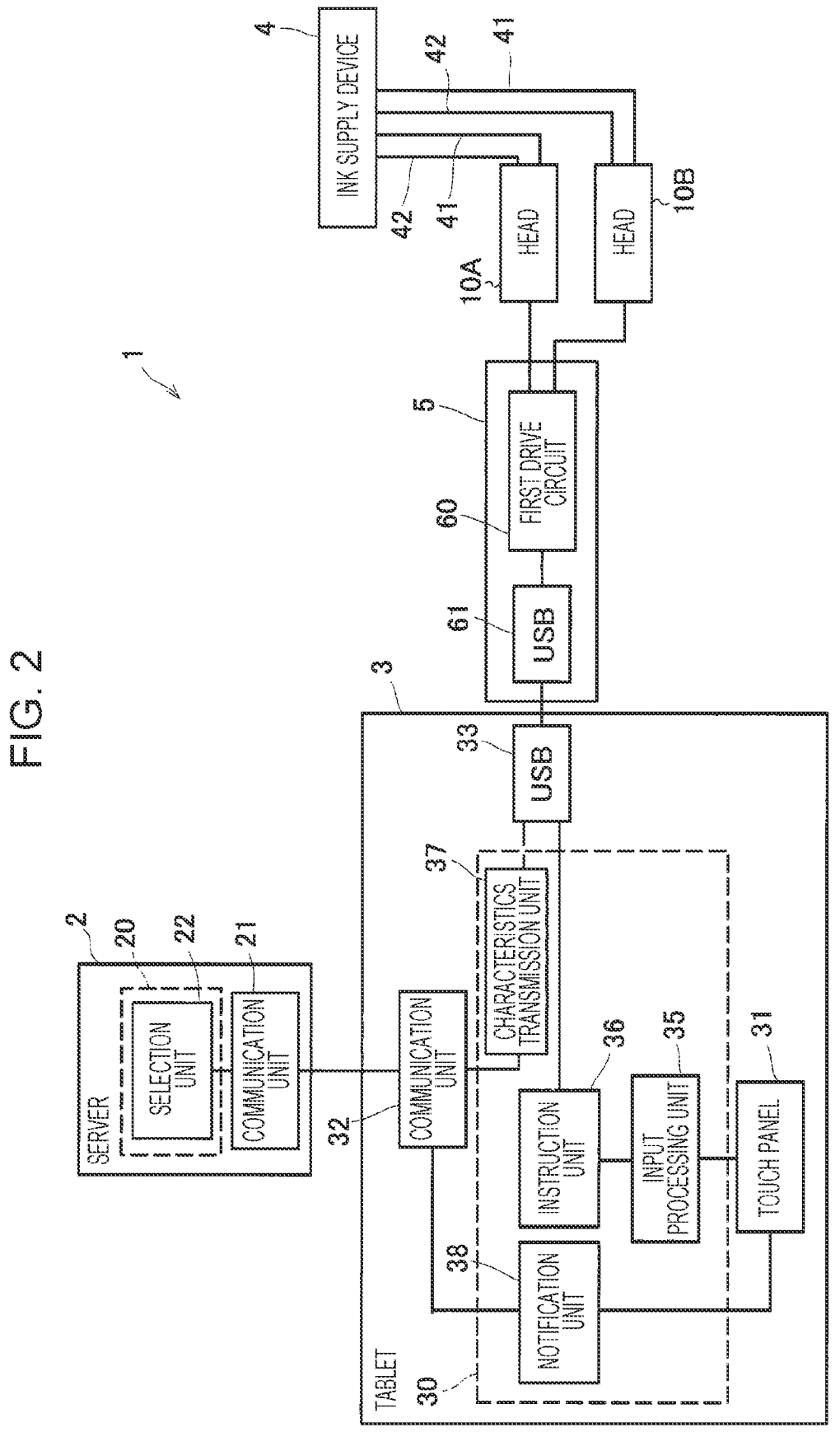
FIG. 2 is a block diagram illustrating a functional configuration of the system according to the first embodiment.

As illustrated in FIGS. 1 and 2, a system 1 according to an exemplary embodiment of the present disclosure includes a server 2, a tablet 3, an ink supply device 4, an experiment device 5, and an ink-jet recording head 10. The ink-jet recording head 10 (hereinafter referred to also as "head 10") is an example of a liquid ejecting head and ejects ink droplets as an example of a liquid.

The server 2 is an information processing apparatus such as a workstation or a personal computer that includes a processing unit (not illustrated), a storage unit such as a hard disk or an SSD (not illustrated), an input/output unit such as a keyboard or a mouse (not illustrated), and a communication unit 21. The server 2 is not limited to such an information processing apparatus. The server 2 may be logically constructed by cloud computing. The communication unit 21 is a device for exchanging information with another apparatus via a communication network such as the Internet. The server 2 is configured to send information to, and receive information from, the tablet 3 via the Internet by using the communication unit 21.

A server program 20 is installed in the storage unit of the server 2. The server program 20 is a program that causes the server 2 to operate as a selection unit 22. A detailed description of the server program 20, including a description of the selection unit 22, will be given later. The selection unit 22, for example, corresponds to a selector.

The tablet 3 is an example of an external device. The tablet 3 is a portable information processing device that includes a processing unit (not illustrated), a storage unit (not illustrated), a touch panel 31, a communication unit 32, and a USB 33. The touch panel 31 is an example of a display unit, and is an example of an input unit that receives an input operation performed by a user, too. The communication unit 32 is a device for exchanging information with another apparatus via a communication network such as the Internet. The tablet 3 is configured to send information to, and receive information from, the server 2 via the Internet by using the communication unit 32. The USB 33 is a universal serial bus. The tablet 3 is configured to send information to, and receive information from, the experiment device 5 via the USB 33. The means for exchanging information between the tablet 3 and the experiment device 5 is not limited to the USB 33. Though a tablet is described herein as an example of an external device, the external device is not limited thereto. The external device may be, for example, a personal computer or a smartphone.

A client program 30, a so-called app (application), is installed in the storage unit of the tablet 3. The client program 30 is a program that causes the tablet 3 to operate as an input processing unit 35, an instruction unit 36, a characteristics transmission unit 37, and a notification unit 38. A detailed description of the client program 30, including a description of these units such as the selection unit 38, will be given later. The input processing unit 35, the instruction unit 36, the characteristics transmission unit 37, and the notification unit 38, for example, correspond to an input processor, an instructor, a characteristics transmitter, and a notifier, respectively.

The ink supply device 4 includes a non-illustrated first supply pump, a non-illustrated second supply pump, a non-illustrated ink container, a non-illustrated reservoir, a supply flow passage 41, and a collection flow passage 42.

The first supply pump is a pump for supplying ink contained in the ink container to the reservoir. The reservoir is a sub tank for temporarily containing the ink supplied from the ink container. The ink contained in the ink container is supplied therefrom to the reservoir by means of the first supply pump; in addition, ink discharged from the head 10 is supplied to the reservoir through the collection flow passage 42. The second supply pump is a pump for sending the ink contained in the reservoir to the head 10.

The ink supply device 4 having the above configuration supplies ink to the head 10 through the supply flow passage 41 and serves as a collection destination to which ink discharged from the head 10 is returned through the collection flow passage 42 for the purpose of being supplied to the head 10 again.

The head 10 is a device that ejects, in the form of ink droplets from nozzles, ink having been supplied from the ink supply device 4. In the present embodiment, as an example of a plurality of heads different from one another, a head 10A, a head 10B, and a head 10C will be described. The head 10A, the head 10B, and the head 10C will be referred to as "head 10" when no distinction is made among them.

Figure 3:
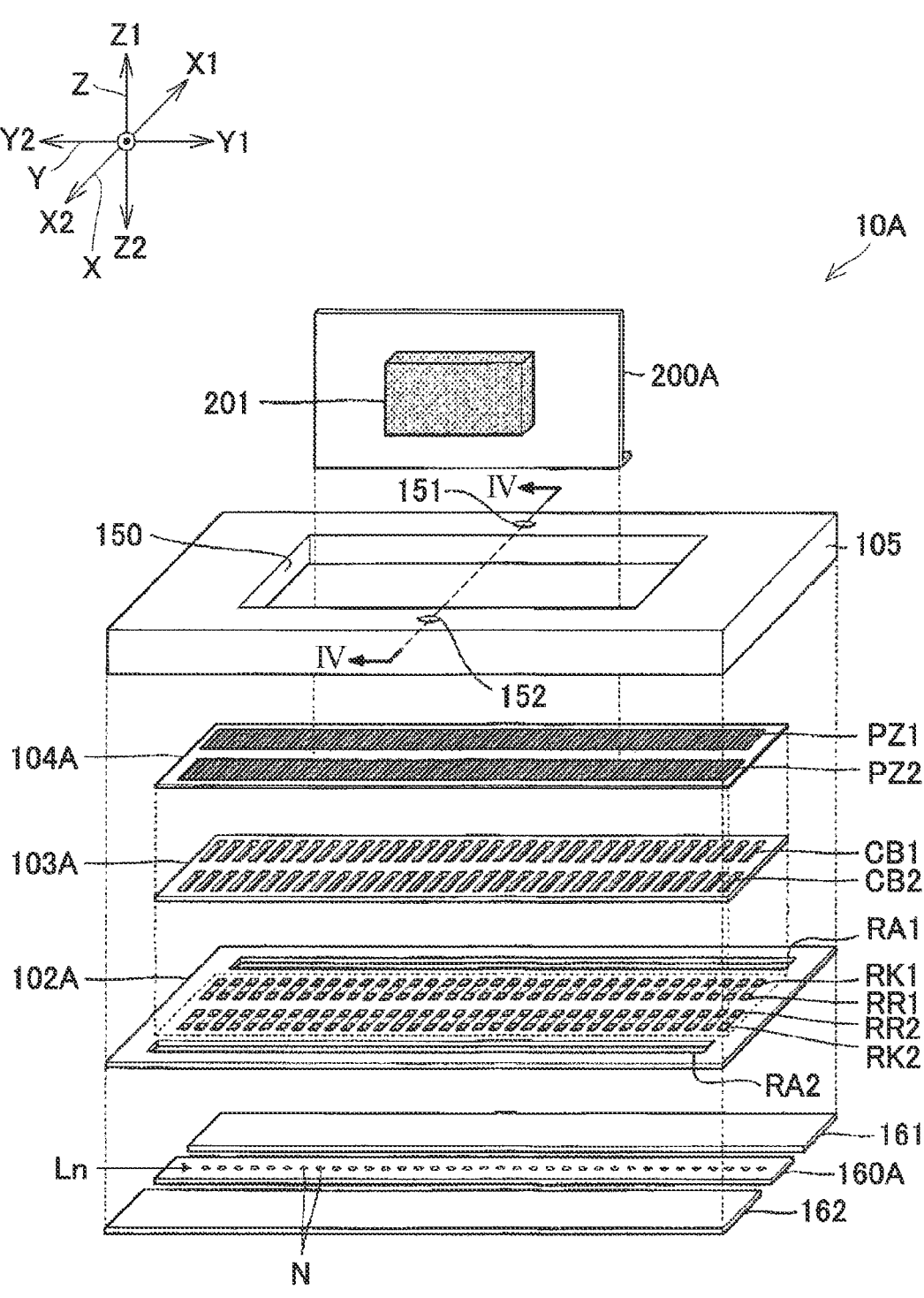
FIG. 3 is an exploded perspective view of a head according to the first embodiment.
Figure 4:
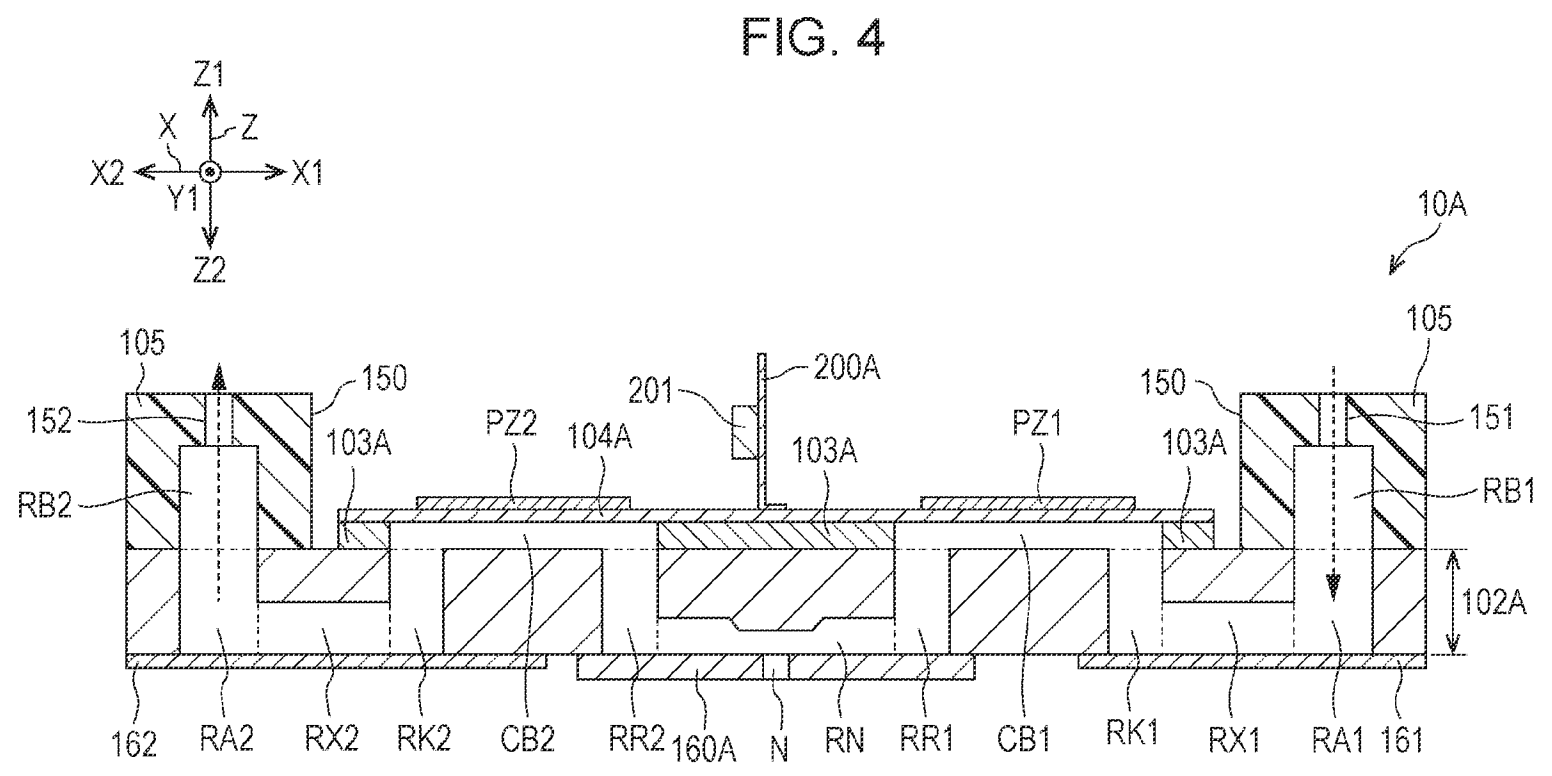
Figure 5:
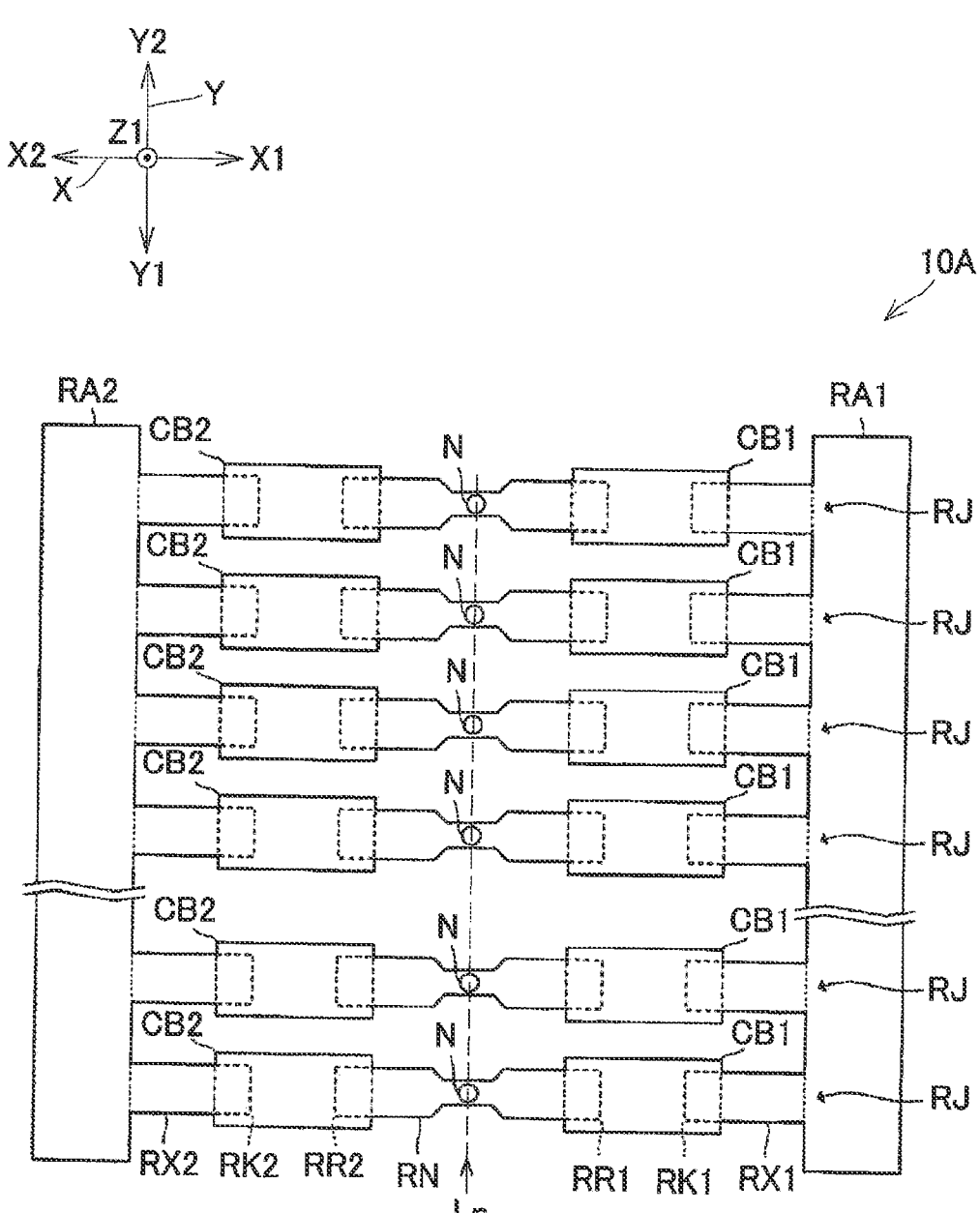
FIG. 5 is a plan view of the head according to the first embodiment.

With reference to FIGS. 3 to 6, the head 10A will now be explained. FIG. 3 is an exploded perspective view of the head 10A. FIG. 4 is a cross-sectional view taken along the line IV-IV of FIG. 3. FIG. 5 is a plan view of the head 10A viewed from the Z1-directional side. To facilitate the readers' understanding, the description below will be given with reference to X, Y, and Z axes intersecting with one another. In the description below, one direction along the X axis will be referred to as the X1 direction, and the direction that is the opposite of the X1 direction will be referred to as the X2 direction. Similarly, directions that are the opposite of each other along the Y axis will be referred to as the Y1 direction and the Y2 direction. Directions that are the opposite of each other along the Z axis will be referred to as the Z1 direction and the Z2 direction. View in the direction along the Z axis may be referred to as "plan view".

Typically, the Z axis is a vertical axis, and the Z2 direction corresponds to a vertically-downward direction. However, the Z axis does not necessarily have to be a vertical axis. The X, Y, and Z axes are typically orthogonal to one another, but are not limited thereto. It is sufficient as long as the X, Y, and Z axes intersect with one another within an angular range of, for example, 80° or greater and 100° or less.

As illustrated in FIGS. 3 and 4, the head 10A includes a nozzle substrate 160A, a compliance sheet 161, a compliance sheet 162, a communication plate 102A, a pressure compartment substrate 103A, a diaphragm 104A, a reservoir forming substrate 105, and a wiring substrate 200A.

As illustrated in FIG. 3, the nozzle substrate 160A is a plate-like member that is elongated in the Y-axis direction and extends substantially in parallel with an X-Y plane. A plurality of nozzles N the number of which is M is formed in the nozzle substrate 160A. The concept of "substantially in parallel with" herein includes not only a case of being perfectly in parallel but also a case of being able to be deemed as parallel, with a margin of error taken into consideration. The nozzle substrate 160A is manufactured by, for example, processing a monocrystalline silicon substrate by using a semiconductor manufacturing technology such as etching. However, known materials and methods can be used for manufacturing the nozzle substrate 160A. The nozzle N is a through hole provided in the nozzle substrate 160A. In the present embodiment, as an example, it is assumed that the plurality M of nozzles N is provided in the nozzle substrate 160A to constitute a nozzle row Ln extending in the Y-axis direction.

As illustrated in FIGS. 3 and 4, the communication plate 102A is provided on the Z1-directional side with respect to the nozzle substrate 160A. The communication plate 102A is a plate-like member that is elongated in the Y-axis direction and extends substantially in parallel with an X-Y plane. Passages through which ink flows are formed in the communication plate 102A.

Specifically, one supply flow passage RA1 and one discharge flow passage RA2 are formed in the communication plate 102A. The supply flow passage RA1 is in communication with a supply flow passage RB1, which will be described later, and extends in the Y-axis direction. The discharge flow passage RA2 is in communication with a discharge flow passage RB2, which will be described later, and is provided on the X2-directional side as viewed from the supply flow passage RA1 in such a way as to extend in the Y-axis direction.

The following flow passages are formed in the communication plate 102A: a plurality M of nozzle flow passages RN having one-to-one correspondence to the plurality M of nozzles N, a plurality M of communication flow passages RR1 having one-to-one correspondence to the plurality M of nozzles N, a plurality M of communication flow passages RR2 having one-to-one correspondence to the plurality M of nozzles N, a plurality M of communication flow passages RK1 having one-to-one correspondence to the plurality M of nozzles N, a plurality M of communication flow passages RK2 having one-to-one correspondence to the plurality M of nozzles N, a plurality M of communication flow passages RX1 having one-to-one correspondence to the plurality M of nozzles N, and a plurality M of communication flow passages RX2 having one-to-one correspondence to the plurality M of nozzles N. The communication plate 102A may have a single communication flow passage RX1 formed to be shared by the plurality M of nozzles N and a single communication flow passage RX2 formed to be shared by the plurality M of nozzles N instead.

As illustrated in FIG. 4, in the present embodiment, the communication flow passage RX1 is in communication with the supply flow passage RA1 and is provided on the X2-directional side as viewed from the supply flow passage RA1 in such a way as to extend in the X-axis direction. The communication flow passage RK1 is in communication with the communication flow passage RX1 and is provided on the X2-directional side as viewed from the communication flow passage RX1 in such a way as to extend in the Z-axis direction. The communication flow passage RR1 is provided on the X2-directional side as viewed from the communication flow passage RK1 in such a way as to extend in the Z-axis direction.

The communication flow passage RX2 is in communication with the discharge flow passage RA2 and is provided on the X1-directional side as viewed from the discharge flow passage RA2 in such a way as to extend in the X-axis direction. The communication flow passage RK2 is in communication with the communication flow passage RX2 and is provided on the X1-directional side as viewed from the communication flow passage RX2 in such a way as to extend in the Z-axis direction. The communication flow passage RR2 is provided on the X1-directional side as viewed from the communication flow passage RK2 and on the X2-directional side as viewed from the communication flow passage RR1 in such a way as to extend in the Z-axis direction.

The nozzle flow passage RN provides communication between the communication flow passage RR1 and the communication flow passage RR2 and is provided on the X2-directional side as viewed from the communication flow passage RR1 and on the X1-directional side as viewed from the communication flow passage RR2 in such a way as to extend in the X-axis direction. The nozzle flow passage RN is in communication with the nozzle N corresponding to this nozzle flow passage RN.

The communication plate 102A is manufactured by, for example, processing a monocrystalline silicon substrate by using a semiconductor manufacturing technology. However, known materials and methods may be used for manufacturing the communication plate 102A.

As illustrated in FIGS. 3 and 4, the pressure compartment substrate 103A is provided on the Z1-directional side with respect to the communication plate 102A. The pressure compartment substrate 103A is a plate-like member that is elongated in the Y-axis direction and extends substantially in parallel with an X-Y plane. Passages through which ink flows are formed in the pressure compartment substrate 103A.

Specifically, a plurality M of pressure compartments CB1 having one-to-one correspondence to the plurality M of nozzles N and a plurality M of pressure compartments CB2 having one-to-one correspondence to the plurality M of nozzles N are formed in the pressure compartment substrate 103A. The pressure compartment CB1 and the pressure compartment CB2 will be referred to as "pressure compartment CB" when no distinction is made between them. The pressure compartment CB1 provides communication between the communication flow passage RK1 and the communication flow passage RR1 and is provided in such a way as to, when viewed in the Z-axis direction, connect the end of the communication flow passage RK1 on the X1-directional side and the end of the communication flow passage RR1 on the X2-directional side and extend in the X-axis direction. The pressure compartment CB2 provides communication between the communication flow passage RK2 and the communication flow passage RR2 and is provided in such a way as to, when viewed in the Z-axis direction, connect the end of the communication flow passage RK2 on the X2-directional side and the end of the communication flow passage RR2 on the X1-directional side and extend in the X-axis direction.

The pressure compartment substrate 103A is manufactured by, for example, processing a monocrystalline silicon substrate by using a semiconductor manufacturing technology. However, known materials and methods may be used for manufacturing the pressure compartment substrate 103A.

In the description below, each ink flow passage providing communication between the supply flow passage RA1 and the discharge flow passage RA2 will be referred to as "circulation flow passage RJ".

As illustrated in FIG. 5, communication between the supply flow passage RA1 and the discharge flow passage RA2 is provided by a plurality M of circulation flow passages RJ having one-to-one correspondence to the plurality M of nozzles N. Each of the plurality of circulation flow passages RJ includes, as described above, the communication flow passage RX1 that is in communication with the supply flow passage RA1, the communication flow passage RK1 that is in communication with the communication flow passage RX1, the pressure compartment CB1 that is in communication with the communication flow passage RK1, the communication flow passage RR1 that is in communication with the pressure compartment CB1, the nozzle flow passage RN that is in communication with the communication flow passage RR1, the communication flow passage RR2 that is in communication with the nozzle flow passage RN, the pressure compartment CB2 that is in communication with the communication flow passage RR2, the communication flow passage RK2 that is in communication with the pressure compartment CB2, and the connection flow passage RX2 that provides communication between the connection flow passage RK2 and the discharge flow passage RA2. In the present embodiment, as an example, it is assumed that each circulation flow passage RJ extends in the X-axis direction.

As illustrated in FIGS. 3 and 4, the diaphragm 104A is provided on the Z1-directional side with respect to the pressure compartment substrate 103A. The diaphragm 104A is a plate-like member that is elongated in the Y-axis direction and extends substantially in parallel with an X-Y plane. The diaphragm 104A is a member that is able to vibrate elastically.

As illustrated in FIGS. 3 and 4, a plurality M of piezoelectric actuators PZ1 having one-to-one correspondence to the plurality M of pressure compartments CB1 and a plurality M of piezoelectric actuators PZ2 having one-to-one correspondence to the plurality M of pressure compartments CB2 are provided on the Z1-side surface of the diaphragm 104A. In the description below, the piezoelectric actuator PZ1 and the piezoelectric actuator PZ2 will be collectively referred to as "piezoelectric actuator PZq". The piezoelectric actuator PZq is a passive element that deforms in response to a change in potential of a drive signal COM. In other words, the piezoelectric actuator PZq is an example of an energy conversion element that converts the electric energy of the drive signal COM into motion energy. In the description below, a suffix "q" may be affixed to each reference sign that represents a component corresponding to the piezoelectric actuator PZq.

Figure 6:
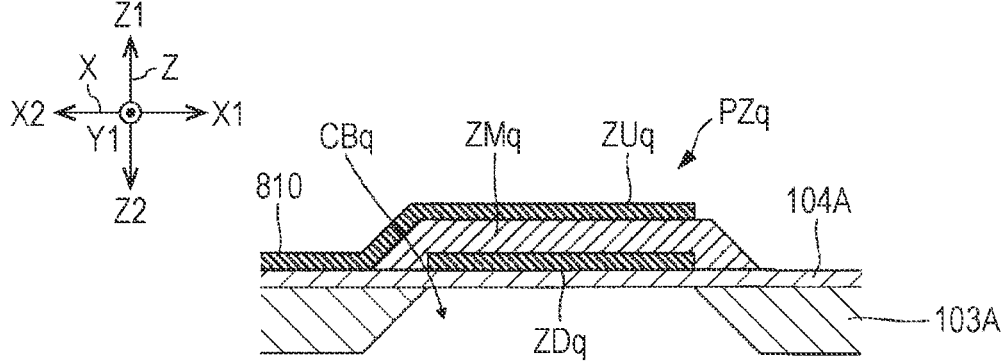
FIG. 6 is an enlarged cross-sectional view of a piezoelectric actuator, including its neighborhood.

FIG. 6 is an enlarged cross-sectional view of the piezoelectric actuator PZq, including its neighborhood. As illustrated in FIG. 6, the piezoelectric actuator PZq has a layered structure in which a piezoelectric material ZMq is sandwiched between a lower electrode ZDq and an upper electrode ZUq. A predetermined reference potential VBS is supplied to the lower electrode ZDq. The drive signal COM is supplied to the upper electrode ZUq. The piezoelectric actuator PZq is, for example, a portion where the lower electrode ZDq, the upper electrode ZUq, and the piezoelectric material ZMq overlap with one another when viewed from the Z1-directional side. A pressure compartment CBq is provided on the Z2-directional side with respect to the piezoelectric actuator PZq.

As described above, the piezoelectric actuator PZq is driven to deform in accordance with a change in level of the potential of the drive signal COM. The diaphragm 104A vibrates by being driven by the deformation of the piezoelectric actuator PZq. The vibration of the diaphragm 104A causes changes in pressure inside the pressure compartment CBq. Because of the changes in pressure inside the pressure compartment CBq, ink with which the inside of the pressure compartment CBq is filled flows through a communication flow passage RRq and the nozzle flow passage RN to be ejected from the nozzle N.

As illustrated in FIGS. 3 and 4, the wiring substrate 200A is mounted on the Z1-side surface of the diaphragm 104A. The wiring substrate 200A is a component for providing electric coupling between the experiment device 5 and the head 10A. For example, a flexible wiring board such as an FPC or an FFC can be preferably used as the wiring substrate 200A. "FPC" is an acronym for Flexible Printed Circuit. "FFC" is an acronym for Flexible Flat Cable. A second drive circuit 201 is mounted on the wiring substrate 200A. As illustrated in FIG. 6, the second drive circuit 201 supplies the drive signal COM to the upper electrode ZUq of the piezoelectric actuator PZq via a wiring line 810.

In the description below, the drive signal COM supplied to the piezoelectric actuator PZ1 may be referred to as "drive signal COM1", and the drive signal COM supplied to the piezoelectric actuator PZ2 may be referred to as "drive signal COM2". In the present embodiment, it is assumed that, when ink is to be ejected from the nozzle N, the waveform of the drive signal COM1 that is supplied to the piezoelectric actuator PZ1 corresponding to the nozzle N by the second drive circuit 201 is substantially the same as the waveform of the drive signal COM2 that is supplied to the piezoelectric actuator PZ2 corresponding to the nozzle N by the second drive circuit 201. The concept of "substantially the same" herein includes not only a case of being perfectly the same but also a case of being able to be deemed as the same, with a margin of error taken into consideration.

As illustrated in FIGS. 3 and 4, the reservoir forming substrate 105 is provided on the Z1-directional side with respect to the communication plate 102A. The reservoir forming substrate 105 is a member that is elongated in the Y-axis direction. Passages through which ink flows are formed in the reservoir forming substrate 5.

Specifically, one supply flow passage RB1 and one discharge flow passage RB2 are formed in the reservoir forming substrate 105. The supply flow passage RB1 is in communication with the supply flow passage RA1 and is provided on the Z1-directional side as viewed from the supply flow passage RA1 in such a way as to extend in the Y-axis direction. The discharge flow passage RB2 is in communication with the discharge flow passage RA2 and is provided on the Z1-directional side as viewed from the discharge flow passage RA2 and on the X2-directional side as viewed from the supply flow passage RB1 in such a way as to extend in the Y-axis direction.

A feed inlet 151, which is in communication with the supply flow passage RB1, and a discharge outlet 152, which is in communication with the discharge flow passage RB2, are provided in the reservoir forming substrate 105. Ink is supplied from the ink supply device 4 into the supply flow passage RB1 through the feed inlet 151. Ink having entered the discharge flow passage RB2 is discharged through the discharge outlet 152 and is then returned to the ink supply device 4.

The reservoir forming substrate 105 has an opening 150. The pressure compartment substrate 103A, the diaphragm 104A, and the wiring substrate 200A are provided inside the opening 150.

The reservoir forming substrate 105 is formed by, for example, injection molding of a resin material. However, known materials and methods may be used for manufacturing the reservoir forming substrate 105.

In the present embodiment, ink supplied from the ink supply device 4 to the feed inlet 151 flows through the supply flow passage RB1 into the supply flow passage RA1. Then, a part of the ink that has flowed into the supply flow passage RA1 flows through the communication flow passage RX1 and the communication flow passage RK1 into the pressure compartment CB1. A part of the ink that has flowed into the pressure compartment CB1 flows through the communication flow passage RR1, the nozzle flow passage RN, and the communication flow passage RR2 into the pressure compartment CB2. Then, a part of the ink that has flowed into the pressure compartment CB2 flows through the communication flow passage RK2, the communication flow passage RX2, the discharge flow passage RA2, and the discharge flow passage RB2 to be discharged from the discharge outlet 152.

When the piezoelectric actuator PZ1 is driven by the drive signal COM1, a part of ink with which the inside of the pressure compartment CB1 is filled flows through the communication flow passage RR1 and the nozzle flow passage RN to be ejected from the nozzle N. When the piezoelectric actuator PZ2 is driven by the drive signal COM2, a part of ink with which the inside of the pressure compartment CB2 is filled flows through the communication flow passage RR2 and the nozzle flow passage RN to be ejected from the nozzle N.

As illustrated in FIGS. 3 and 4, the compliance sheet 161 is provided on the Z2-side surface of the communication plate 102A in such a way as to hermetically close the supply flow passage RA1, the communication flow passage RX1, and the communication flow passage RK1. The compliance sheet 161 is made of an elastic material. The compliance sheet 161 absorbs the pressure fluctuations of ink inside the supply flow passage RA1, the communication flow passage RX1, and the communication flow passage RK1. The compliance sheet 162 is provided on the Z2-side surface of the communication plate 102A in such a way as to hermetically close the discharge flow passage RA2, the communication flow passage RX2, and the communication flow passage RK2. The compliance sheet 162 is made of an elastic material. The compliance sheet 162 absorbs the pressure fluctuations of ink inside the discharge flow passage RA2, the communication flow passage RX2, and the communication flow passage RK2.

As explained above, in the head 10A, ink is circulated from the supply flow passage RA1 to the discharge flow passage RA2 via the circulation flow passage RJ. For this reason, in the present embodiment, even if there is a period during which no ink that is present inside the pressure compartment CB1 and the pressure compartment CB2 is ejected from the nozzle N, it is possible to prevent the ink from staying inside the pressure compartment CB1, the pressure compartment CB2, the nozzle flow passage RN, etc. Therefore, in the present embodiment, even if there is a period during which no ink that is present inside the pressure compartment CB1, the pressure compartment CB2, and the nozzle flow passage RN is ejected from the nozzle N, it is possible to prevent the viscosity of the ink that is present inside the pressure compartment CB1, the pressure compartment CB2, and the nozzle flow passage RN from increasing. This makes it possible to prevent the occurrence of ejection abnormality in which it is impossible to perform ejection from the nozzle N due to the increased viscosity of the ink.

Moreover, the head 10A is able to eject ink contained inside the pressure compartment CB1 and is able to eject ink contained inside the pressure compartment CB2 from the nozzle N. Therefore, for example, as compared with a structure in which ink contained inside one pressure compartment CB1 only is ejected from the nozzle N or with a structure in which ink contained inside one pressure compartment CB2 only is ejected from the nozzle N, the head 10A makes it possible to make an amount of ink ejected from the nozzle N larger.

Next, the head 10B will now be described. In the head 10A described above, one piezoelectric actuator PZ1 and one piezoelectric actuator PZ2 are provided individually for each nozzle N. By contrast, in the head 10B, either one piezoelectric actuator PZ1 or one piezoelectric actuator PZ2 is provided individually for each nozzle N.

Figure 7:
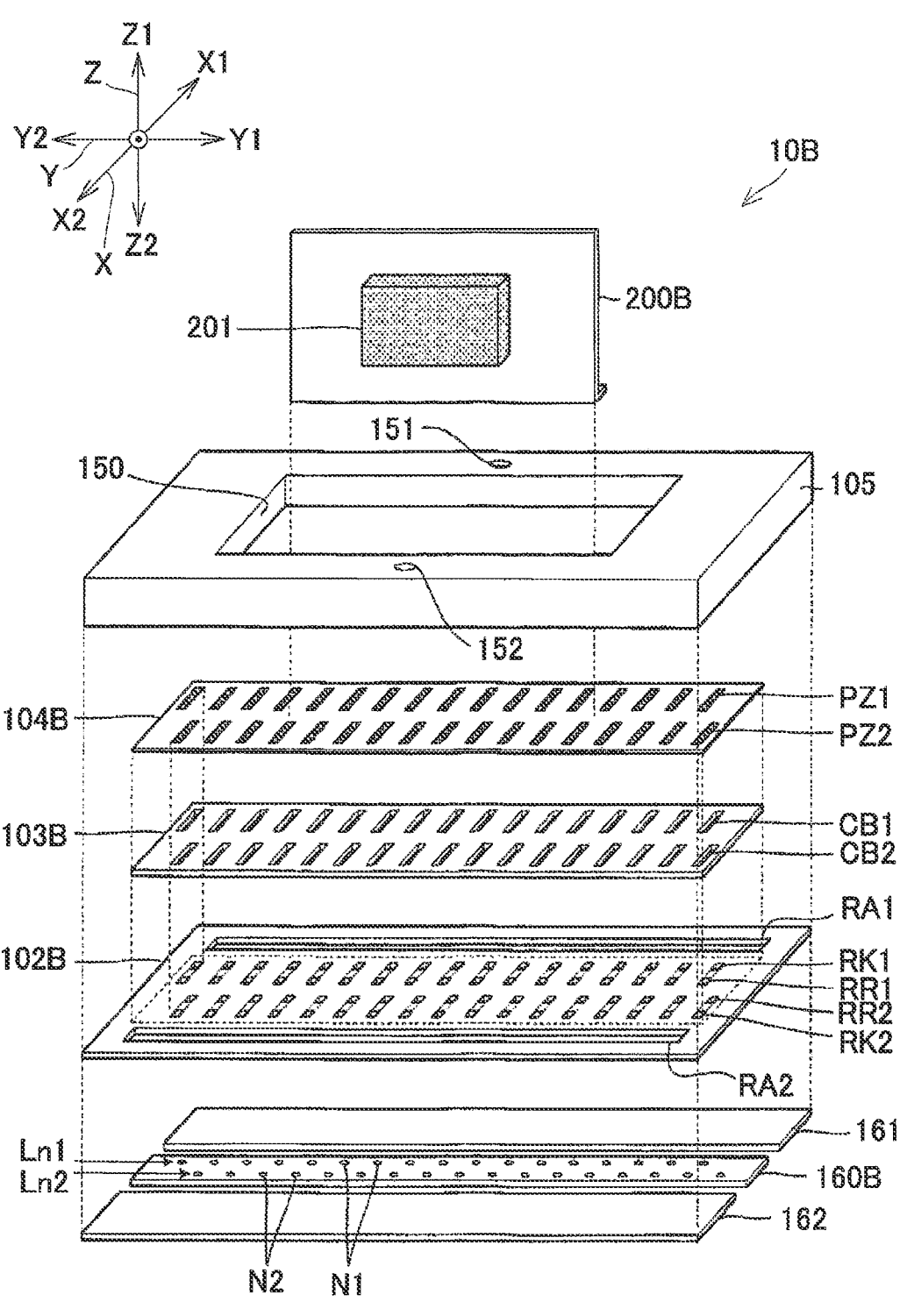
FIG. 7 is an exploded perspective view of another head according to the first embodiment.

FIG. 7 is an exploded perspective view of the head 10B. As illustrated in FIG. 7, the head 10B is different from the head 10A in that it includes a nozzle substrate 160B in place of the nozzle substrate 160A, a communication plate 102B in place of the communication plate 102A, a pressure compartment substrate 103B in place of the pressure compartment substrate 103A, a diaphragm 104B in place of the diaphragm 104A, and a wiring substrate 200B in place of the wiring substrate 200A.

Among them, the nozzle substrate 160B is different from the nozzle substrate 160A of the head 10A in that a nozzle row Ln1 and a nozzle row Ln2 are provided in place of the nozzle row Ln. The nozzle row Ln1 is an array of nozzles N the number of which is M1 and which are arranged in a line extending in the Y-axis direction. The nozzle row Ln2 is an array of nozzles N the number of which is M2 and which are arranged in a line extending in the Y-axis direction on the X2-directional side with respect to the nozzle row Ln1. The number M1 is a natural number, and the number M2 is also a natural number. An equation "M1+M2=M" holds. It is assumed here that M is a natural number that is equal to or greater than 2. In the description below, the nozzles N that constitute the nozzle row Ln1 may be referred to as "nozzles N1", and the nozzles N that constitute the nozzle row Ln2 may be referred to as "nozzles N2".

The communication plate 102B is different from the communication plate 102A of the head 10A in that a plurality M1 of communication flow passages RX1 having one-to-one correspondence to the plurality M1 of nozzles N1 is provided in place of the plurality M of communication flow passages RX1, a plurality M2 of communication flow passages RX2 having one-to-one correspondence to the plurality M2 of nozzles N2 is provided in place of the plurality M of communication flow passages RX2, a plurality M1 of communication flow passages RK1 having one-to-one correspondence to the plurality M1 of nozzles N1 is provided in place of the plurality M of communication flow passages RK1, a plurality M2 of communication flow passages RK2 having one-to-one correspondence to the plurality M2 of nozzles N2 is provided in place of the plurality M of communication flow passages RK2, a plurality M1 of communication flow passages RR1 having one-to-one correspondence to the plurality M1 of nozzles N1 is provided in place of the plurality M of communication flow passages RR1, and a plurality M2 of communication flow passages RR2 having one-to-one correspondence to the plurality M2 of nozzles N2 is provided in place of the plurality M of communication flow passages RR2. Similarly to the communication plate 102A, the communication plate 102B has the supply flow passage RA1 formed in such a way as to extend in the Y-axis direction and the discharge flow passage RA2 formed on the X2-directional side as viewed from the supply flow passage RA1 in such a way as to extend in the Y-axis direction.

The pressure compartment substrate 103B is different from the pressure compartment substrate 103A of the head 10A in that a plurality M1 of pressure compartments CB1 having one-to-one correspondence to the plurality M1 of nozzles N1 is provided in place of the plurality M of pressure compartments CB1, and a plurality M2 of pressure compartments CB2 having one-to-one correspondence to the plurality M2 of nozzles N2 is provided in place of the plurality M of pressure compartments CB2.

The diaphragm 104B is different from the diaphragm 104A of the head 10A in that a plurality M1 of piezoelectric actuators PZ1 having one-to-one correspondence to the plurality M1 of nozzles N1 is provided in place of the plurality M of piezoelectric actuators PZ1, and a plurality M2 of piezoelectric actuators PZ2 having one-to-one correspondence to the plurality M2 of nozzles N2 is provided in place of the plurality M of piezoelectric actuators PZ2.

Figure 8:
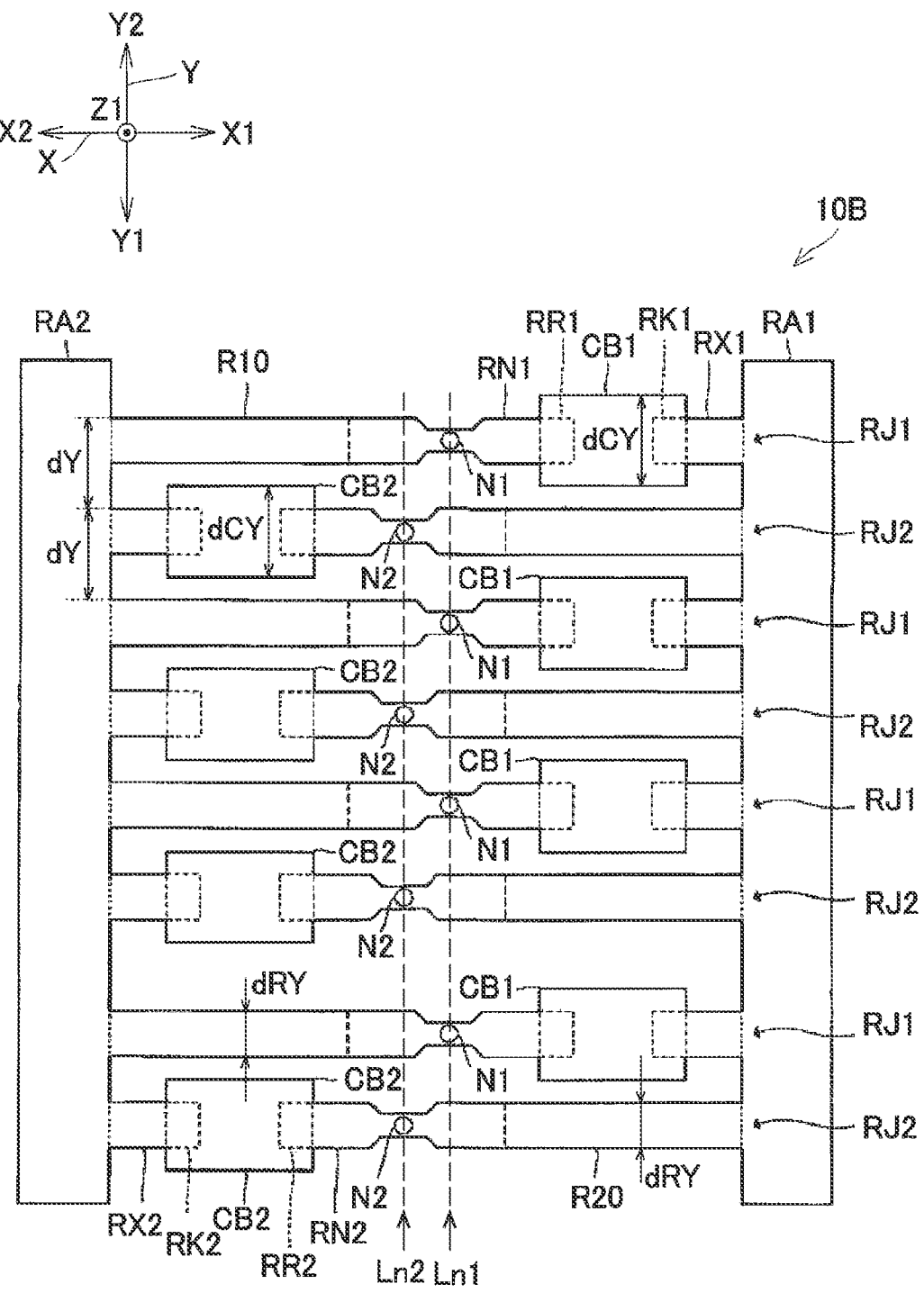
FIG. 8 is a plan view of the another head according to the first embodiment.

FIG. 8 is a plan view of the head 10B viewed in the Z-axis direction. The head 10B has a plurality M of circulation flow passages RJ having one-to-one correspondence to the plurality M of nozzles N provided in the nozzle substrate 160B. In the description below, among the circulation flow passages RJ, those provided correspondingly to the nozzles N1 may be referred to as "circulation flow passages RJ1", and those provided correspondingly to the nozzles N2 may be referred to as "circulation flow passages RJ2". That is, in the head 10B, the supply flow passage RA1 and the discharge flow passage RA2 are in communication with each other through the plurality M1 of circulation flow passages RJ1 and the plurality M2 of circulation flow passages RJ2.

In the head 10B, the circulation flow passages RJ1 and the circulation flow passages RJ2 are arranged alternately in the Y-axis direction. In the head 10B, the plurality M1 of circulation flow passages RJ1 and the plurality M2 of circulation flow passages RJ2 are arranged such that an interval in the Y-axis direction of the circulation flow passages RJ1 and the circulation flow passages RJ2 that are arranged adjacently to each other is an interval dY.

As described above, the circulation flow passage RJ1 has the pressure compartment CB1, and the circulation flow passage RJ2 has the pressure compartment CB2. In the head 10B, as illustrated in FIG. 8, the pressure compartment CB1 is provided on the X1-directional side with respect to the nozzle N1, and the pressure compartment CB2 is provided on the X2-directional side with respect to the nozzle N2. In addition, as described above, the nozzle row Ln1, to which the nozzles N1 belong, is provided on the X1-directional side with respect to the nozzle row Ln2, to which the nozzles N2 belong. Therefore, in the head 10B, the pressure compartment CB1 is located on the X1-directional side with respect to the pressure compartment CB2.

In addition, in the head 10B, the circulation flow passage RJ1 is provided such that its width in the Y-axis direction at the pressure compartment CB1 is a width dCY and its width in the Y-axis direction at a portion other than the pressure compartment CB1 is not greater than a width dRY. The circulation flow passage RJ2 is provided such that its width in the Y-axis direction at the pressure compartment CB2 is the width dCY and its width in the Y-axis direction at a portion other than the pressure compartment CB2 is not greater than the width dRY. In addition, in the head 10B, it is assumed that the plurality M1 of circulation flow passages RJ1 and the plurality M2 of circulation flow passages RJ2 are provided such that the interval dY and the width dCY satisfy "dY<dCY" and such that the interval dY and the width dRY satisfy "dY>dRY". In FIG. 8, for the purpose of making an explanation simpler and easier to understand, a structure in which the interval dY and the width dRY satisfy "dY>dRY" is illustrated; however, the interval dY and the width dRY may satisfy "dRY>dY". The width of at least a part of the portion other than the pressure compartment CB1 may be greater than the interval dY. The width of at least a part of the portion other than the pressure compartment CB2 may be greater than the interval dY.

As will be explained with reference to FIGS. 9 and 10, in the head 10B, there is almost no Z-directional overlap portion at each position in the X-axis direction between the circulation flow passage RJ1 and the circulation flow passage RJ2 that are adjacent to each other in the Y-axis direction. For this reason, almost no structural crosstalk occurs between the circulation flow passage RJ1 and the circulation flow passage RJ2, and it suffices to consider only a structural crosstalk between two circulation flow passages RJ1 between which the circulation flow passage RJ2 is interposed and a structural crosstalk between two circulation flow passages RJ2 between which the circulation flow passage RJ1 is interposed. Therefore, as compared with a structure in which the pressure compartment CB1 and the pressure compartment CB2 are provided at the same position in the X-axis direction, it is possible to make the pitch of the circulation flow passages RJ narrower. Moreover, in the head 10B, it is possible to reduce a flow-passage resistance in the circulation flow passage RJ1 while designing the pitch of the circulation flow passages RJ to be narrow. Furthermore, in the head 10B, it is possible to ensure sufficient capacity of the pressure compartment CB1 and the pressure compartment CB2 by designing the width dCY in the Y-axis direction of the pressure compartment CB1 and the pressure compartment CB2 to be wide while designing the pitch of the circulation flow passages RJ to be narrow.

Figure 9:
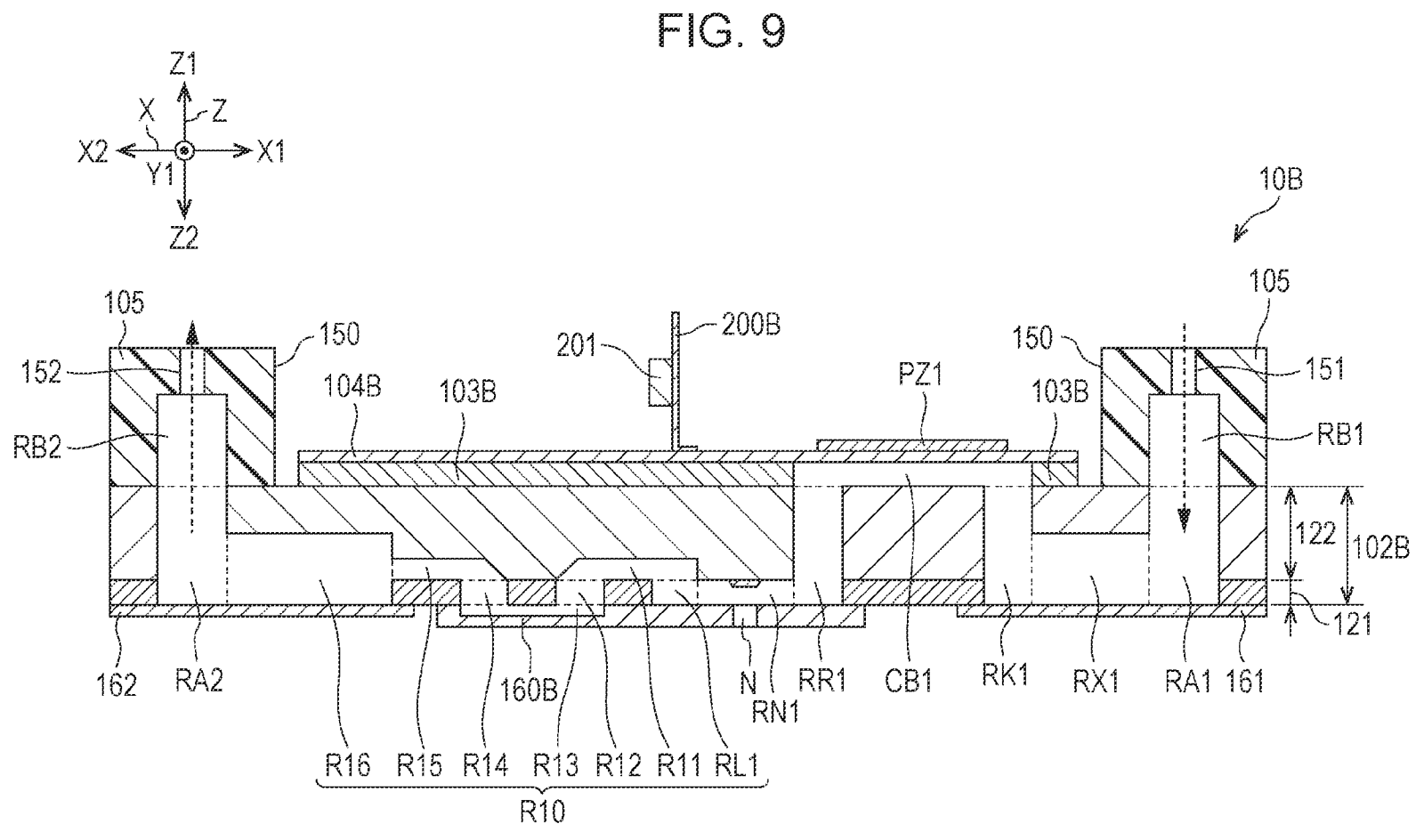

FIG. 9 is a cross-sectional view of the head 10B taken in parallel with an X-Z plane in such a way as to go through the circulation flow passage RJ1. FIG. 10 is a cross-sectional view of the head 10B taken in parallel with an X-Z plane in such a way as to go through the circulation flow passage RJ2.

Figure 10:
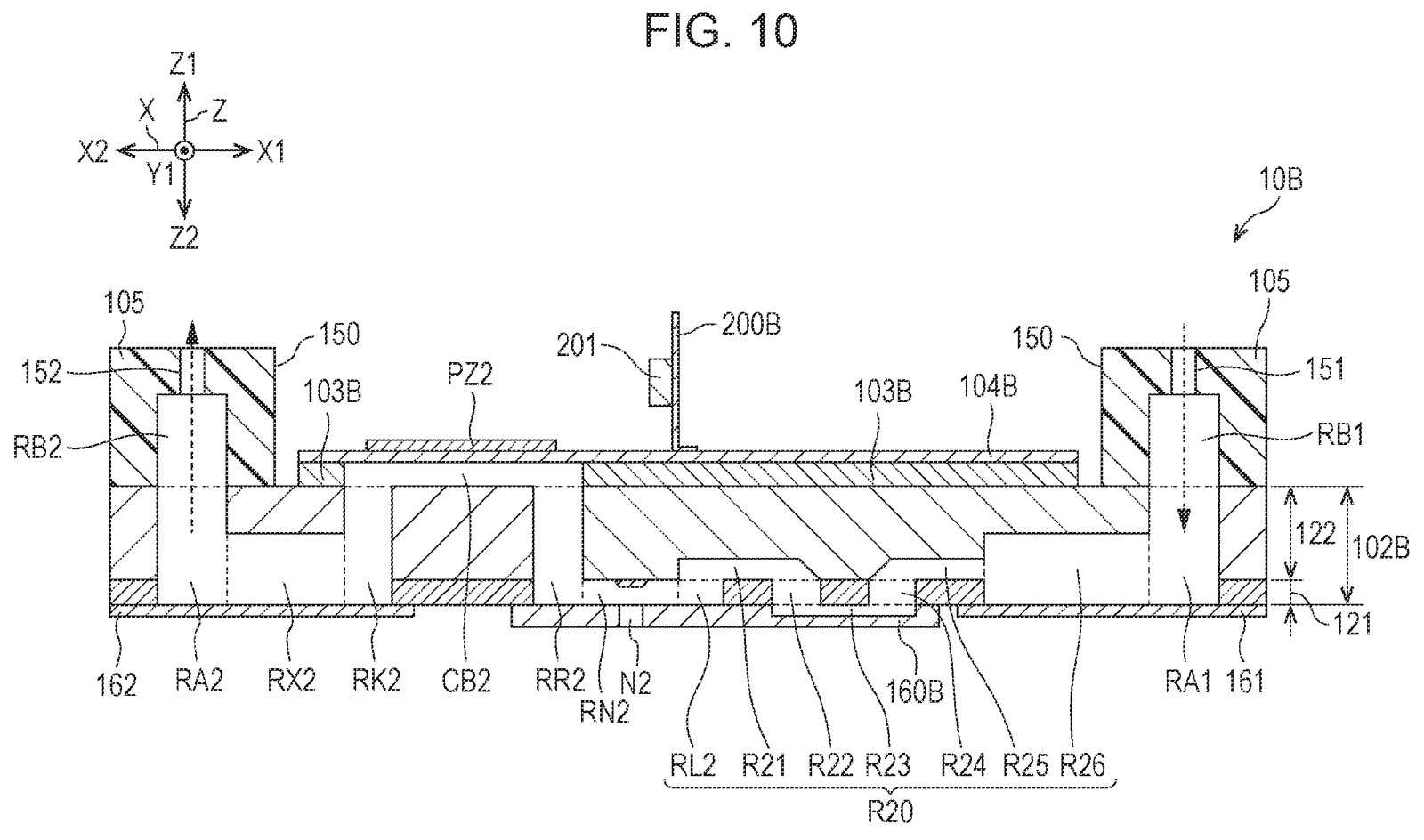

As illustrated in FIGS. 9 and 10, in the head 10B, the communication plate 102B includes a substrate 121 and a substrate 122. The substrate 121 and the substrate 122 are manufactured by, for example, processing a monocrystalline silicon substrate by using a semiconductor manufacturing technology such as etching. However, known materials and methods can be used for manufacturing the substrate 121 and the substrate 122.

As illustrated in FIG. 9, in the head 10B, the circulation flow passage RJ1 includes the communication flow passage RX1, which is in communication with the supply flow passage RA1 and is formed in the substrate 121 and the substrate 122, the communication flow passage RK1, which is in communication with the communication flow passage RX1 and is formed in the substrate 121 and the substrate 122, the pressure compartment CB1, which is in communication with the communication flow passage RK1 and is formed in the pressure compartment substrate 103B, the communication flow passage RR1, which is in communication with the pressure compartment CB1 and is formed in the substrate 121 and the substrate 122, a nozzle flow passage RN1, which is in communication with the communication flow passage RR1 and the nozzle N1 and is formed in the substrate 121, a flow passage RL1, which is in communication with the nozzle flow passage RN1 and is formed in the substrate 121, a flow passage R11, which is in communication with the flow passage RL1 and is formed in the substrate 122, a flow passage R12, which is in communication with the flow passage R11 and is formed in the substrate 121, a flow passage R13, which is in communication with the flow passage R12 and is formed in the nozzle substrate 160B, a flow passage R14, which is in communication with the flow passage R13 and is formed in the substrate 121, a flow passage R15, which is in communication with the flow passage R14 and is formed in the substrate 122, and a flow passage R16, which provides communication between the flow passage R15 and the discharge flow passage RA2 and is formed in the substrate 121 and the substrate 122.

As illustrated in FIG. 10, in the head 10B, the circulation flow passage RJ2 includes the communication flow passage RX2, which is in communication with the discharge flow passage RA2 and is formed in the substrate 121 and the substrate 122, the communication flow passage RK2, which is in communication with the communication flow passage RX2 and is formed in the substrate 121 and the substrate 122, the pressure compartment CB2, which is in communication with the communication flow passage RK2 and is formed in the pressure compartment substrate 103B, the communication flow passage RR2, which is in communication with the pressure compartment CB2 and is formed in the substrate 121 and the substrate 122, a nozzle flow passage RN2, which is in communication with the communication flow passage RR2 and the nozzle N2 and is formed in the substrate 121, a flow passage RL2, which is in communication with the nozzle flow passage RN2 and is formed in the substrate 121, a flow passage R21, which is in communication with the flow passage RL2 and is formed in the substrate 122, a flow passage R22, which is in communication with the flow passage R21 and is formed in the substrate 121, a flow passage R23, which is in communication with the flow passage R22 and is formed in the nozzle substrate 160B, a flow passage R24, which is in communication with the flow passage R23 and is formed in the substrate 121, a flow passage R25, which is in communication with the flow passage R24 and is formed in the substrate 122, and a flow passage R26, which provides communication between the flow passage R25 and the supply flow passage RA1 and is formed in the substrate 121 and the substrate 122.

As illustrated in FIGS. 7, 9, and 10, the wiring substrate 200B is mounted on the Z1-side surface of the diaphragm 104B. The wiring substrate 200B is a component for providing electric coupling between the experiment device 5 and the head 10B. A second drive circuit 201 is mounted on the wiring substrate 200B. Similarly to the second drive circuit 201 of the head 10A, the second drive circuit 201 supplies the drive signal COM to the upper electrode of the piezoelectric actuator PZ of the head 10B.

As described above, in the head 10B, ink is circulated from the supply flow passage RA1 to the discharge flow passage RA2 via the circulation flow passage RJ1 and the circulation flow passage RJ2. For this reason, in the head 10B, even if there is a period during which no ink that is present inside the pressure compartment CB1 and the pressure compartment CB2 is ejected from the nozzle N1 and the nozzle N2, it is possible to prevent the ink from staying inside the pressure compartment CB1, the pressure compartment CB2, the nozzle flow passage RN1, the nozzle flow passage RN2, etc. Therefore, in the head 10B, even if there is a period during which no ink that is present inside the pressure compartment CB1, the pressure compartment CB2, the nozzle flow passage RN1, and the nozzle flow passage RN2 is ejected from the nozzle N1 and the nozzle N2, it is possible to prevent the viscosity of the ink that is present inside the pressure compartment CB1, the pressure compartment CB2, and the nozzle flow passage RN1, and the nozzle flow passage RN2 from increasing. This makes it possible to prevent the occurrence of ejection abnormality in which it is impossible to perform ejection from the nozzle flow passage RN1 and the nozzle flow passage RN2 due to the increased viscosity of the ink.

Next, the head 10C will now be described. In the head 10A described earlier, one piezoelectric actuator PZ1 and one piezoelectric actuator PZ2 are provided individually for each nozzle N. By contrast, in the head 10C, four piezoelectric actuators (not illustrated) are provided individually for each nozzle N.

Figure 11:
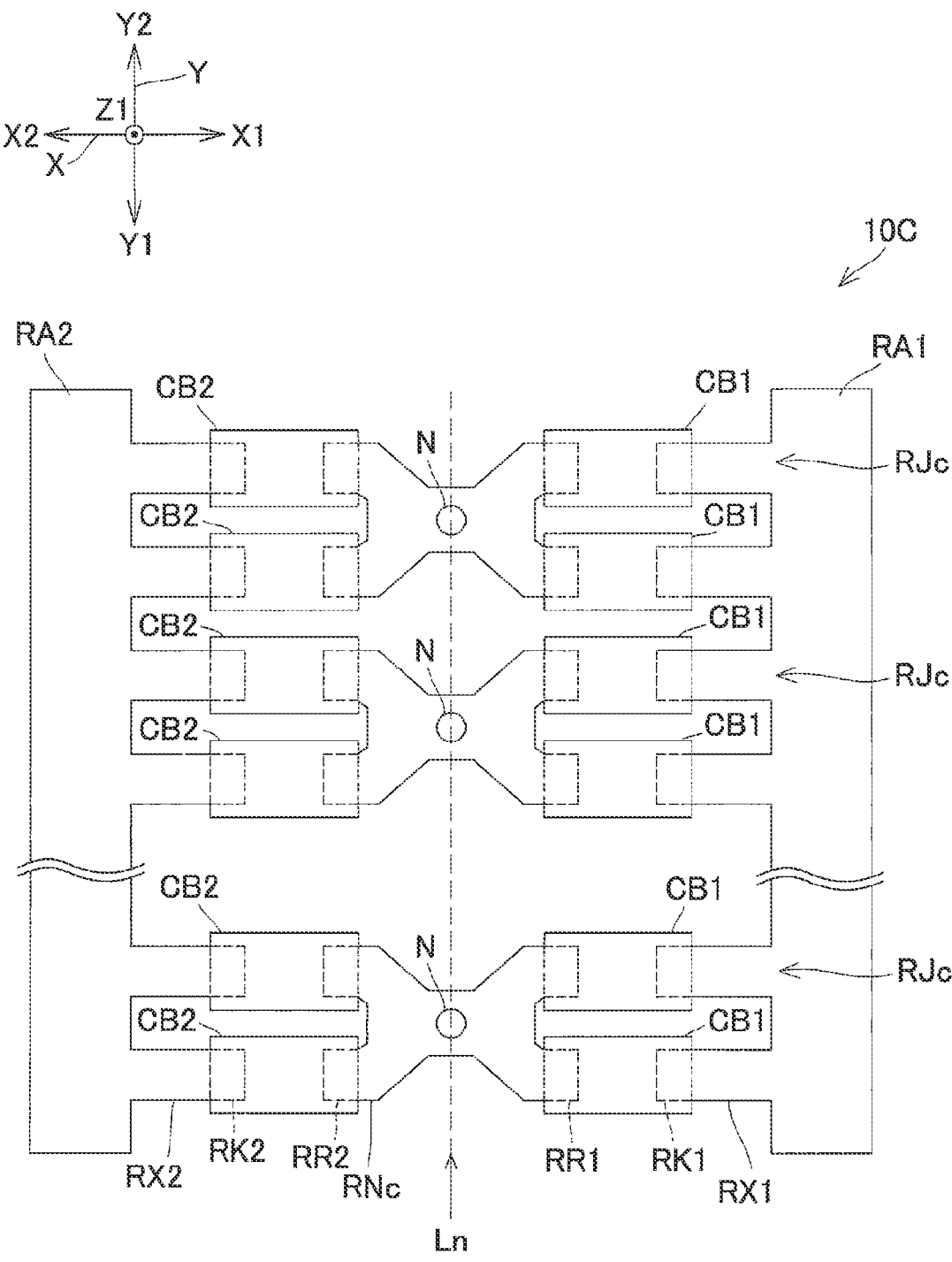
FIG. 11 is a plan view of still another head according to the first embodiment.

FIG. 11 is a plan view of the head 10C viewed in the Z-axis direction. The head 10C is different from the head 10A in that it includes circulation flow passages RJc in place of the circulation flow passages RJ, nozzle flow passages RNc in place of the nozzle flow passages RN, a plurality 2×M of communication flow passages RR1 in place of the plurality M of communication flow passages RR1 corresponding to the plurality M of nozzles N, a plurality 2×M of communication flow passages RR2 in place of the plurality M of communication flow passages RR2 corresponding to the plurality M of nozzles N, a plurality 2×M of communication flow passages RK1 in place of the plurality M of communication flow passages RK1 corresponding to the plurality M of nozzles N, a plurality 2×M of communication flow passages RK2 in place of the plurality M of communication flow passages RK2 corresponding to the plurality M of nozzles N, a plurality 2×M of communication flow passages RX1 in place of the plurality M of communication flow passages RX1 corresponding to the plurality M of nozzles N, a plurality 2×M of communication flow passages RX2 in place of the plurality M of communication flow passages RX2 corresponding to the plurality M of nozzles N, a plurality 2×M of pressure compartments CB1 in place of the plurality M of pressure compartments CB1 corresponding to the plurality M of nozzles N, and a plurality 2×M of pressure compartments CB2 in place of the plurality M of pressure compartments CB2 corresponding to the plurality M of nozzles N.

The head 10C includes a non-illustrated communication plate. The following flow passages are formed in the communication plate of the head 10C: a plurality M of nozzle flow passages RNc having one-to-one correspondence to the plurality M of nozzles N, a plurality 2×M of communication flow passages RR1 having one-to-two correspondence to the plurality M of nozzles N, a plurality 2×M of communication flow passages RR2 having one-to-two correspondence to the plurality M of nozzles N, a plurality 2×M of communication flow passages RK1 having one-to-two correspondence to the plurality M of nozzles N, a plurality 2×M of communication flow passages RK2 having one-to-two correspondence to the plurality M of nozzles N, a plurality 2×M of communication flow passages RX1 having one-to-two correspondence to the plurality M of nozzles N, and a plurality 2×M of communication flow passages RX2 having one-to-two correspondence to the plurality M of nozzles N.

The nozzle flow passage RNc is in communication with the communication flow passage RR1 that is in communication with one of two pressure compartments CB1 that are located adjacent to each other, is in communication with the communication flow passage RR1 that is in communication with the other of the two pressure compartments CB1 that are located adjacent to each other, and is therefore in communication with these two pressure compartments CB1 that are located adjacent to each other through these two communication flow passages RR1.

The nozzle flow passage RNc is in communication with the communication flow passage RR2 that is in communication with one of two pressure compartments CB2 that are located adjacent to each other, is in communication with the communication flow passage RR2 that is in communication with the other of the two pressure compartments CB2 that are located adjacent to each other, and is therefore in communication with these two pressure compartments CB2 that are located adjacent to each other through these two communication flow passages RR2.

The nozzle flow passage RNc is in communication with the nozzle N that corresponds to this nozzle flow passage RNc.

The head 10C includes a non-illustrated pressure compartment substrate. A plurality 2×M of pressure compartments CB1 having one-to-two correspondence to the plurality M of nozzles N and a plurality 2×M of pressure compartments CB2 having one-to-two correspondence to the plurality M of nozzles N are formed in the pressure compartment substrate of the head 10C.

In the head 10C, communication between the supply flow passage RA1 and the discharge flow passage RA2 is provided by the plurality M of circulation flow passages RJc having one-to-one correspondence to the plurality M of nozzles N.

Each circulation flow passages RJc includes two communication flow passages RX1 that are in communication with the supply flow passage RA1 and are located adjacent to each other, a communication flow passage RK1 that is in communication with one of the two communication flow passages RX1 located adjacent to each other, another communication flow passage RK1 that is in communication with the other of the two communication flow passages RX1 located adjacent to each other, a pressure compartment CB1 that is in communication with one of the two communication flow passages RK1 located adjacent to each other, another pressure compartment CB1 that is in communication with the other of the two communication flow passages RK1 located adjacent to each other, a communication flow passage RR1 that is in communication with one of the two pressure compartments CB1 located adjacent to each other, another communication flow passage RR1 that is in communication with the other of the two pressure compartments CB1 located adjacent to each other, a nozzle flow passage RNc that is in communication with the two communication flow passages RR1 located adjacent to each other, two communication flow passages RR2 that are in communication with the nozzle flow passage RNc and are located adjacent to each other, a pressure compartment CB2 that is in communication with one of the two communication flow passages RR2 located adjacent to each other, another pressure compartment CB2 that is in communication with the other of the two communication flow passages RR2 located adjacent to each other, a communication flow passage RK2 that is in communication with one of the two pressure compartments CB2 located adjacent to each other, another communication flow passage RK2 that is in communication with the other of the two pressure compartments CB2 located adjacent to each other, a communication flow passage RX2 that is in communication with the discharge flow passage RA2 and one of the two communication flow passages RK2 located adjacent to each other, and another communication flow passage RX2 that is in communication with the discharge flow passage RA2 and the other of the two communication flow passages RK2 located adjacent to each other.

A non-illustrated wiring substrate is mounted in the head 10C similarly to the head 10A. The wiring substrate is a component for providing electric coupling between the experiment device 5 and the head 10C. In the present embodiment, the wiring substrate of the head 10C has a shape that enables it to be coupled to a connector 51A of the experiment device 5.

The head 10C includes the plurality M of circulation flow passages RJc having one-to-one correspondence to the plurality M of nozzles N. Each circulation flow passage RJc includes two pressure compartments CB1 and two pressure compartments CB2, namely, four pressure compartments in total. In the head 10C, similarly to the head 10A, for each pressure compartment CB1, CB2, a piezoelectric actuator having one-to-one correspondence thereto is provided. Therefore, in the head 10C, a plurality 4×M of pressure compartments and a plurality 4×M of piezoelectric actuators are provided correspondingly to the plurality M of nozzles N.

In the head 10C, ink is circulated from the supply flow passage RA1 to the discharge flow passage RA2 via the circulation flow passage RJc. For this reason, in the head 10C, even if there is a period during which no ink that is present inside the pressure compartment CB1 and the pressure compartment CB2 is ejected from the nozzle N, it is possible to prevent the ink from staying inside the pressure compartment CB1, the pressure compartment CB2, the nozzle flow passage RNc, etc. Therefore, in the head 10C, even if there is a period during which no ink that is present inside the pressure compartment CB1, the pressure compartment CB2, and the nozzle flow passage RNc is ejected from the nozzle N, it is possible to prevent the viscosity of the ink that is present inside the pressure compartment CB1, the pressure compartment CB2, and the nozzle flow passage RNc from increasing. This makes it possible to prevent the occurrence of ejection abnormality in which it is impossible to perform ejection from the nozzle N due to the increased viscosity of the ink.

In the head 10A, the head 10B, and the head 10C, since ink is circulated by providing the circulation flow passage RJ, RJc, the thickening of ink in the neighborhood of the nozzle N due to moisture evaporation from the nozzle N is prevented or suppressed.

The head 10A, the head 10B, and the head 10C have been described above. In the description below, the diaphragm 104A, the diaphragm 104B, and the diaphragm (not illustrated) of the head 10C will be collectively referred to also as "diaphragm 104". The pressure compartment CB1 and the pressure compartment CB2 of each of the head 10A, the head 10B, and the head 10C will be collectively referred to also as "pressure compartment CB". The circulation flow passage RJ of the head 10A, the circulation flow passage RJ1 and the circulation flow passage RJ2 of the head 10B, and the circulation flow passage RJc of the head 10C will be collectively referred to also as "circulation flow passage RJ". The nozzle N of each of the head 10A and the head 10C, and the nozzle N1 and the nozzle N2 of the head 10B will be collectively referred to also as "nozzle N". The piezoelectric actuator PZ1 and the piezoelectric actuator PZ2 of each of the head 10A, the head 10B, and the head 10C will be collectively referred to also as "piezoelectric actuator PZq".

The head 10A, the head 10B, and the head 10C described above are different from one another. A plurality of heads different from one another means heads different in structure or heads with different drive forces of their piezoelectric actuators PZq. The phrase "with different drive forces" means that pressure applied to ink present inside the pressure compartment CB differs when the same drive signal is applied. For example, heads that differ in terms of the following factor, though not limited thereto, fall under the definition of "heads different from one another": the area size of a portion of the drive element facing the pressure compartment CB, the thickness of the drive element, or the material thereof. The term "drive element" means an element that causes pressure changes in the pressure compartment CB. In the present embodiment, the piezoelectric actuator PZq (referred to also as "piezoelectric element") is used as the drive element.

For example, the head 10A, the head 10B, and the head 10C described above are different in terms of drive force, though all of them prevent or suppress the thickening of ink. That is, in the head 10A, one pressure compartment CB1 and one pressure compartment CB2 are provided for each one nozzle N. In the head 10B, one pressure compartment CB1 is provided for each one nozzle N1, and one pressure compartment CB2 is provided for each one nozzle N2. In the head 10C, two pressure compartments CB1 and two pressure compartments CB2 are provided for each one nozzle N. Since the number of pressure compartments provided for each one nozzle differs as described above, the head 10C has a greater drive force than the head 10A, and the head 10A has a greater drive force than the head 10B.

As described above, the head 10A, the head 10B, and the head 10C fall under the definition of "a plurality of heads with different drive forces" due to a difference in the number of pressure compartments provided for each one nozzle. The meaning of "a plurality of heads different from one another" is, needless to mention, not limited to these three kinds.

Each of the head 10A, the head 10B, and the head 10C having the above-described structure receives supply of ink from the ink supply device 4, fills the circulation flow passage RJ with the ink, and causes deformation of the diaphragm 104 and the piezoelectric actuator PZq that correspond to the pressure compartment CB in accordance with a drive signal supplied from a first drive circuit 60, which will be described later, and a drive signal supplied from the second drive circuit 201. This operation increases the internal pressure of each pressure compartment CB, resulting in ejection of an ink droplet from the nozzle N.

Figure 12:
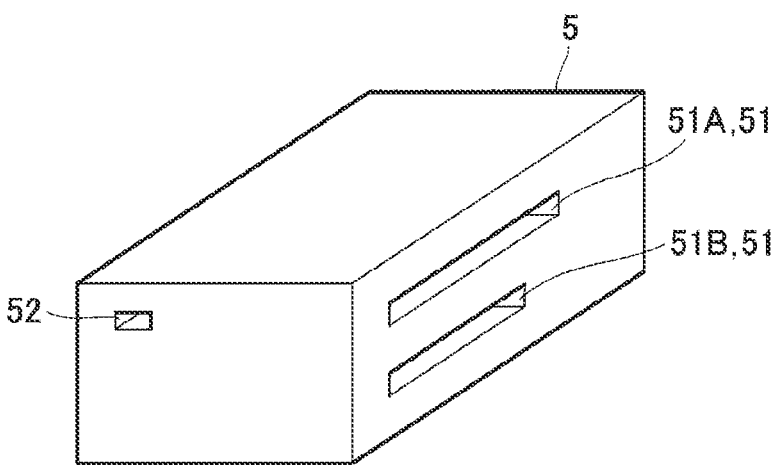
FIG. 12 is a diagram illustrating an appearance of an experiment device according to the first embodiment.
Figure 13:
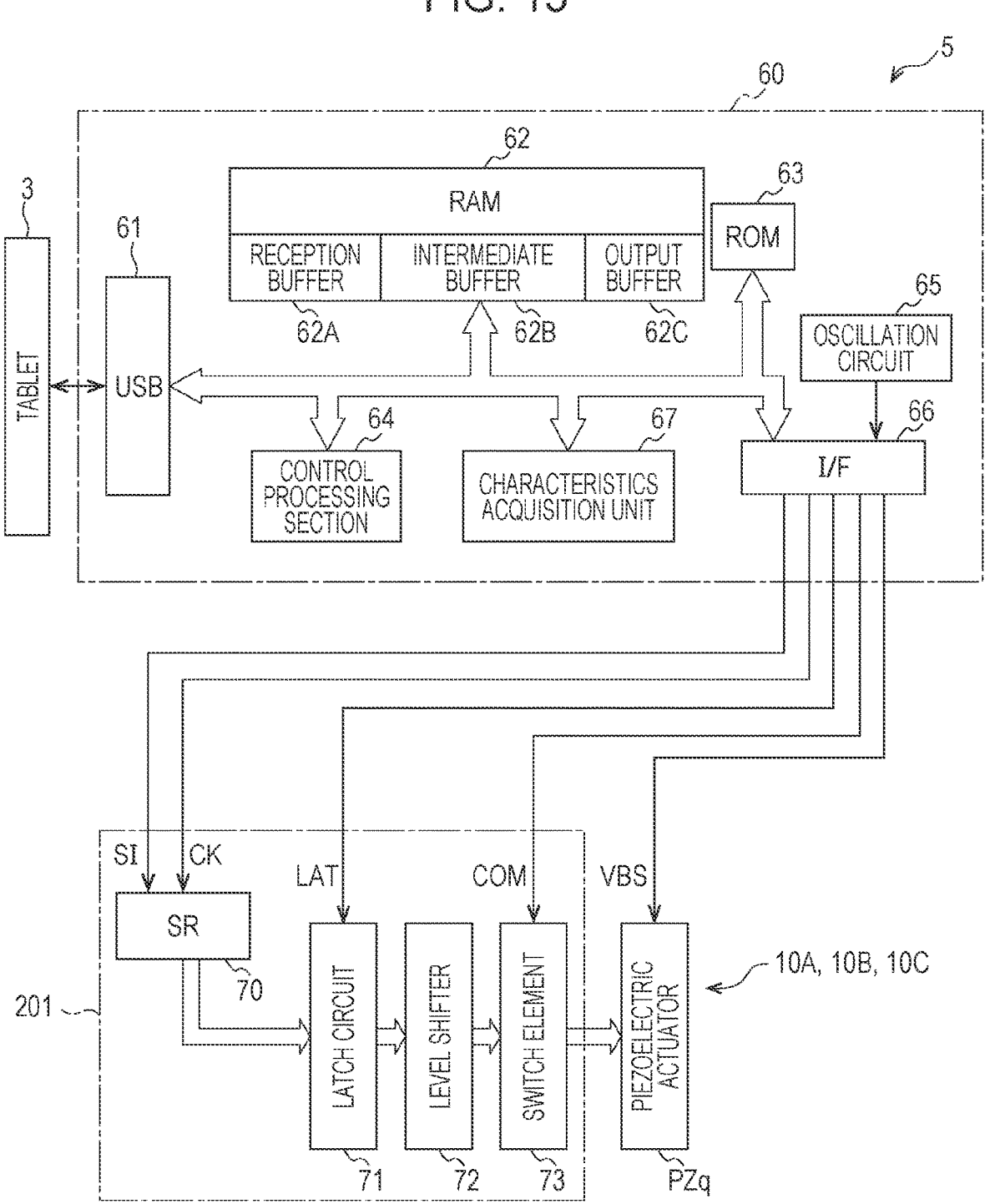
FIG. 13 is a block diagram illustrating a functional configuration of the experiment device according to the first embodiment.

The head 10 described above is controlled by the experiment device 5. With reference to FIGS. 12 and 13, the experiment device 5 will now be explained. FIG. 12 is a diagram illustrating an appearance of the experiment device. FIG. 13 is a block diagram illustrating a functional configuration of the experiment device.

As illustrated in FIG. 12, the experiment device 5 is a device to which the head 10 can be coupled. The meaning of "the head 10 can be coupled" is that the experiment device 5 is capable of sending a signal for ejecting ink to the head 10. Therefore, the coupling may be wired connection or wireless connection. The experiment device 5 according to the present embodiment is provided with a connector 51A, to which a wiring substrate 200A is to be coupled, and a connector 51B, to which a wiring substrate 200B is to be coupled. In the present embodiment, the wiring substrate of the head 10C can also be coupled to the connector 51A. That is, the connector 51A is a common connector for the head 10A and the head 10C. In addition, the experiment device 5 is capable of being coupled to the tablet 3 by means of USB connection. Specifically, the experiment device 5 is provided with a USB connector 52, to which a USB cable (not illustrated) can be coupled. The means for data transmission/reception between the experiment device 5 and the tablet 3 is not limited to USB. The means may be wireless communication. The connector 51A, for example, corresponds to a first connector. The connector 51B, for example, corresponds to a second connector.

As illustrated in FIG. 13, the experiment device 5 includes a first drive circuit 60 serving as a common drive circuit configured to drive the plurality of heads 10. The first drive circuit 60 has a function of generating a drive signal for each of the head 10A, the head 10B, and the head 10C and transmitting the drive signals to the head 10A, the head 10B, and the head 10C via the wiring substrate 200. First, a description will be given below based on an assumption that the head 10A is coupled to the connector 51A and the head 10B is coupled to the connector 51B.

Specifically, the first drive circuit 60 includes a USB 61, a RAM 62, which temporarily stores various kinds of data, a ROM 63, in which control programs and the like are stored, and a control processing unit 64, which includes a CPU and the like. The first drive circuit 60 further includes an oscillation circuit 65, which generates a clock signal, and an internal interface 66 (hereinafter abbreviated as "internal I/F 66"), which transmits dot pattern data (bitmap data) rendered based on the drive signal to the head 10.

The USB 61 is a circuit for data transmission/reception in a predetermined format at a predetermined timing between the tablet 3 and the experiment device 5. An instruction for causing the head 10 to eject ink is transmitted from the tablet 3 to the experiment device 5 via the USB 61. The instruction contains, for example, designation of the head 10A or the head 10B as the head instructed to eject ink, drive signals applied to the head 10A and the head 10B, and the like. Each drive signal for the corresponding head 10 is stored into the RAM 62, which will be described below.

In addition, ejection characteristics information on the head 10A and the head 10B is transmitted from the experiment device 5 to the tablet 3 via the USB 61. A description of the ejection characteristics information will be given later.

The RAM 62 behaves as a reception buffer 62A, an intermediate buffer 62B, an output buffer 62C, and a non-illustrated work memory. The reception buffer 62A temporarily stores print data received by the USB 61. The intermediate buffer 62B stores intermediate code data converted by the control processing unit 64. The output buffer 62C stores dot pattern data.

Besides control programs (control routines) for execution of various kinds of data processing, font data, graphic functions, and the like are stored in the ROM 63.

The control processing unit 64 receives, from the tablet 3, a designation of the head 10A or the head 10B as the head from which ink should be ejected, and causes the designated one, namely, the head 10A or the head 10B, to perform ink ejection.

Specifically, the control processing unit 64 reads the print data out of the reception buffer 62A, obtains intermediate code data by converting the print data, and causes the intermediate buffer 62B to store the intermediate code data. In addition, the control processing unit 64 analyzes the intermediate code data read out of the intermediate buffer 62B, and renders the intermediate code data into dot pattern data while referring to font data, graphic functions, etc. stored in the ROM 63. Then, after performing necessary decoration processing, the control processing unit 64 causes the output buffer 62C to store the rendered dot pattern data.

Then, upon completion of obtaining dot pattern data for one line, the dot pattern data for one line is outputted to the head 10A or the head 10B via the internal I/F 66. For example, when the designated head is the head 10A, the dot pattern data is transmitted to the second drive circuit 201 of the wiring substrate 200A coupled to the connector 51A from the internal I/F 66.

Upon completion of outputting the dot pattern data for one line from the output buffer 62C, the already-rendered intermediate code data is deleted from the intermediate buffer 62B, and rendering processing for the next intermediate code data is performed.

The second drive circuit 201 provided on the wiring substrate 200 of the head 10 includes shift registers 70, latch circuits 71, level shifters 72, and switch elements 73. The number of the shift registers 70, the latch circuits 71, the level shifters 72, and the switch elements 73 each corresponds to the number of the piezoelectric actuators PZq of the head 10.

In synchronization with a clock signal (CK) supplied from the oscillation circuit 65, one line of print data (SI) that constitutes dot pattern data is serial-transferred from the output buffer 62C to the shift registers 70 of the second drive circuit 201.

Upon completion of setting the one line of print data (SI) (for all nozzles) to the shift registers 70, the control processing unit 64 commands that a latch signal (LAT) be outputted to the latch circuits 71 at a predetermined timing. Based on the latch signal, the latch circuit 71 latches the print data having been set to the shift register 70. The output of the latch circuit 71 is applied to the level shifter 72, which is a voltage amplifier. The level shifter 72 boosts the print data to a voltage value at which the switch element 73 can be driven, for example, to several tens of volts, when, for example, the print data is "1". Then, the boosted print data is applied to the switch element 73, and the switch element 73 goes into a connected state.

Then, a drive signal (COM) stored in the RAM 62 is applied to the switch element 73. Specifically, a drive signal for the head 10A stored in the RAM 62 is applied from the internal I/F 66 to the switch element 73 of the wiring substrate 200A coupled to the connector 51A. A drive signal for the head 10B stored in the RAM 62 is applied from the internal I/F 66 to the switch element 73 of the wiring substrate 200B coupled to the connector 51B.

When the switch element 73 goes into a connected state, the drive signal is applied to the piezoelectric actuator PZq coupled to this switch element 73. In this way, among the plurality of piezoelectric actuators PZq, the drive signal is applied to each piezoelectric actuator PZq that ejects ink based on the dot pattern, and ink for one line in the dot pattern is ejected. Ejection of ink for each line is repeated until the end of the dot pattern data.

The experiment device 5 executes the above-described control for ink ejection in accordance with instructions from the tablet 3. Specifically, the experiment device 5 receives a designation of the head from which ink should be ejected, the drive signal to be used, the print data for ejection, and the like from the tablet 3.

For example, when the designated one from which ink should be ejected is the head 10A, a dot pattern is generated based on the print data, the dot pattern and the drive signal for the head 10A stored in the RAM 62 are transmitted to the second drive circuit 201 of the wiring substrate 200A, thereby instructing the head 10A to eject ink. The above operation is the same for the head 10B.

As described above, the experiment device 5 is capable of causing the designated one of the head 10A and the head 10B, which is designated from the tablet 3, to eject ink in accordance with the print data based on the drive signal transmitted from the tablet 3. As for the head 10C, ink ejection and acquisition of ejection characteristics information are performed after detaching the head 10A and the head 10B from the experiment device 5 and attaching the head 10C, which is different from these heads, to the experiment device 5. That is, the experiment device 5 causes the head 10C designated from the tablet 3 to eject ink in accordance with the print data based on the drive signal for the head 10C transmitted from the tablet 3. Then, the experiment device 5 acquires ejection characteristics information from the head 10C.

The drive signal that is used does not necessarily have to be a drive signal transmitted from the tablet 3. For example, plural kinds of drive signal may be pre-stored in the ROM 63, and from among the drive signals pre-stored in the ROM 63, one designated from the tablet 3 may be used. The print data does not necessarily have to be transmitted from the tablet 3 to the experiment device 5. For example, print data pre-stored in the ROM 63 may be used.

The experiment device 5 includes a characteristics acquisition unit 67. In the present embodiment, the characteristics acquisition unit 67 is configured as a part of the first drive circuit 60. The characteristics acquisition unit 67 acquires ejection characteristics information, which is about ejection characteristics of the head 10. Then, the experiment device 5 transmits the acquired ejection characteristics information to the tablet 3.

The ejection characteristics are characteristics of an ink droplet ejected from the head 10 and characteristics regarding an event/phenomenon that has occurred in the head 10 due to ejection of an ink droplet. Information that represents these characteristics is referred to as ejection characteristics information. Examples of the characteristics of an ink droplet ejected from the head 10 include an ejection amount of an ink droplet, an ejection speed, an ejection angle of an ink droplet, a shape of an ink droplet, and the like.

Examples of the characteristics regarding an event/phenomenon that has occurred in the head 10 due to ejection of an ink droplet include various parameters obtained from residual vibration. The various parameters include raw data of residual vibration. When the piezoelectric actuator PZq causes the deformation of the diaphragm 104, free vibration of the diaphragm 104 occurs at a natural vibration frequency that is determined based on the shape of a flow passage through which ink flows, a flow-passage resistance due to a viscosity, etc. of ink, an inertance that is based on the weight of ink inside a flow passage, and a compliance of the diaphragm 104. Such free vibration is residual vibration.

The piezoelectric actuator PZq deforms due to residual vibration, and the piezoelectric actuator PZq generates an electric signal. The characteristics acquisition unit 67 is configured to read, via the second drive circuit 201, an electric signal that is generated at the piezoelectric actuator PZq and represents residual vibration. The characteristics acquisition unit 67 stores the raw data of residual vibration as ejection characteristics information into the RAM 62.

An example of the various parameters obtained from residual vibration is a viscosity of ink. When ink has a high viscosity, the attenuation of residual vibration will be great because of an increase in flow-passage resistance. Therefore, based on the attenuation of residual vibration, it is possible to estimate the viscosity of ink. The characteristics acquisition unit 67 calculates various parameters such as the viscosity of ink and then stores the results of calculation as ejection characteristics information into the RAM 62. The characteristics acquisition unit 67 does not necessarily have to calculate various parameters. For example, the characteristics acquisition unit 67 may perform acquisition of raw data of residual vibration only, and the client program of the tablet 3 or the server program of the server 2 may calculate the various parameters described above based on the raw data of residual vibration.

When an ejection amount of an ink droplet, an ejection speed, an ejection angle of an ink droplet, or a shape of an ink droplet is adopted as ejection characteristics, these kinds of ejection characteristics can be acquired as follows. That is, a camera that is capable of capturing an image of an ink droplet ejected from the head 10 is provided. The characteristics acquisition unit 67 is able to obtain information on an ejection amount of an ink droplet by performing image processing on the image captured by the camera.

For example, it is possible to find the size of an ink droplet from the ink droplet in the captured image, and, if ink density is pre-stored in the storage device of the experiment device 5, it is possible to find an ejection amount of an ink droplet based on the size of the ink droplet and the density, thereby obtaining ejection characteristics information. The ejection speed can be found based on time between a plurality of images and positions of an ink droplet, thereby obtaining ejection characteristics information. The ejection angle of an ink droplet can be found based on an angle between the trajectory of the ink droplet and a vertical direction, thereby obtaining ejection characteristics information. The shape of an ink droplet can be found from the captured image of the ink droplet, thereby obtaining ejection characteristics information.

The characteristics acquisition unit 67 transmits the ejection characteristics information obtained for each head 10 and for each drive signal to the tablet 3. Then, the ejection characteristics information is transmitted from the tablet 3 to the server 2 and is processed thereat.

With reference to FIG. 2, the server program 20 and the client program 30 will now be explained. The server program 20 is a program that causes the server 2 to operate as a selection unit 22.

The communication unit 21 of the server 2 acquires, via the tablet 3, the ejection characteristics information acquired by the characteristics acquisition unit 67 (see FIG. 13) of the experiment device 5.

Based on the ejection characteristics information acquired from the communication unit 21, the selection unit 22 selects a first liquid ejecting head from among the plurality of heads 10. In addition, based on pieces of ejection characteristics information, the selection unit 22 according to the present embodiment selects a second liquid ejecting head and a third liquid ejecting head from among the plurality of heads 10.

The first liquid ejecting head is a liquid ejecting head that has the best ejection characteristics among a plurality of liquid ejecting heads. An example of a liquid ejecting head that has the best ejection characteristics is a liquid ejecting head whose ejection characteristics are closest to a desired value set by the user of the system 1 (hereinafter referred to as "user setting value"). When there is no user setting value, the liquid ejecting head that has the best ejection characteristics is a liquid ejecting head whose ejection characteristics are closest to a value that is preset in the system 1 (hereinafter referred to as "default setting value"). The user/default setting value is either set into the server 2 by using an input-and-output device or the like or inputted into the tablet 3 by using the touch panel 31 and is then transmitted to the server 2 to be stored into the storage device of the server 2. Of course, the first liquid ejecting head is not limited to a liquid ejecting head whose ejection characteristics are closest to the user setting value or the default setting value. A liquid ejecting head that has the minimum value of ejection characteristics, the highest ejection characteristics, or the most stable ejection characteristics may be selected as the first liquid ejecting head.

The second liquid ejecting head is a liquid ejecting head(s) whose ejection characteristics are inferior to the ejection characteristics of the first liquid ejecting head but satisfy tolerance conditions among the plurality of liquid ejecting heads. The third liquid ejecting head is a liquid ejecting head(s) whose ejection characteristics do not satisfy the tolerance conditions among the plurality of liquid ejecting heads.

The meaning of "satisfy tolerance conditions" is that its ejection characteristics are within a predetermined range from the user setting value or the default setting value, though not closest to the user setting value or the default setting value. The meaning of "do not satisfy the tolerance conditions" is that its ejection characteristics are not within the predetermined range from the user setting value or the default setting value. The predetermined range is stored in the storage device of the server 2, as is the case with the user setting value and the default setting value.

A description will be given below while taking, as an example, a case where ink viscosity obtained from raw data of residual vibration is used as ejection characteristics. Suppose that, as illustrated in Table 1, values "100", "110", and 120" are obtained as the ink viscosity of the head 10A, the head 10B, and the head 10C, respectively.

TABLE 1

| | Ejection characteristics information, Ink viscosity | Absolute standard | Relative standard (100 ± 10%) |
|---|---|---|---|
| Head 10A | 100 | First liquid ejecting head | First liquid ejecting head |
| Head 10B | 110 | | Second liquid ejecting head |
| Head 10C | 120 | | Third liquid ejecting head |

When a standard "the head 10 that has the lowest ink viscosity among the plurality of heads 10 should be selected as the first liquid ejecting head that has the best ejection characteristics", which is a standard that is not based on any comparison with some sort of standard value (hereinafter referred to as "absolute standard"), is adopted, the selection unit 22 selects the head 10A, which has the lowest ink viscosity, as the first liquid ejecting head. The selection unit 22 does not select the head 10B nor the head 10C as the first liquid ejecting head because their ejection characteristics are not the best ejection characteristics.

The standard for selection is not limited to the absolute standard described above. The selection unit 22 may use a standard that is based on comparison with the user setting value or the default setting value (hereinafter referred to as "relative standard"). An example of the relative standard is shown in A to C below:

A. "The head 10 whose ink viscosity representing ejection characteristics is closest to the ink viscosity set as the user setting value or the default setting value among the plurality of heads 10 should be selected as the first liquid ejecting head that has the best ejection characteristics;"

B. "The head(s) 10 whose ink viscosity representing ejection characteristics is within a predetermined range (±10%) from the ink viscosity (100) set as the user setting value or the default setting value among the plurality of heads 10 should be selected as the second liquid ejecting head that satisfies tolerance conditions;"

C. "The head(s) 10 whose ink viscosity representing ejection characteristics is not within the predetermined range (±10%) from the ink viscosity (100) set as the user setting value or the default setting value among the plurality of heads 10 should be selected as the third liquid ejecting head that does not satisfy the tolerance conditions."

As illustrated in Table 1, when a relative standard is adopted, the selection unit 22 selects the head 10A as the first liquid ejecting head, the head 10B as the second liquid ejecting head, and the head 10C as the third liquid ejecting head.

Though a case where ink viscosity obtained from residual vibration is used as ejection characteristics has been described above, instead, residual vibration itself may be used as ejection characteristics information, and the first to third liquid ejecting heads may be selected based thereon. For example, the selection unit 22 may select a liquid ejecting head for which it takes the shortest time for residual vibration to calm down as the first liquid ejecting head from among the plurality of heads 10. As another example, the selection unit 22 may select, from among the plurality of heads 10, a liquid ejecting head for which the time taken for residual vibration to calm down is closest to the user setting value or the default setting value as the first liquid ejecting head, a liquid ejecting head(s) for which the time taken for residual vibration to calm down is within a predetermined range from the user setting value or the default setting value as the second liquid ejecting head, and a liquid ejecting head(s) for which the time taken for residual vibration to calm down is not within the predetermined range from the user setting value or the default setting value as the third liquid ejecting head.

The selection unit 22 may select the first to third liquid ejecting heads by using an ejection amount of an ink droplet, an ejection speed, an ejection angle, or ink-droplet stability as ejection characteristics information.

When an ejection amount of an ink droplet, an ejection speed, or an ejection angle is used as ejection characteristics information, the selection unit 22 selects, as the first liquid ejecting head from among the plurality of heads 10, a liquid ejecting head whose ejection amount, ejection speed, or ejection angle as pieces of ejection characteristics information is closest to the ejection amount, ejection speed, or ejection angle set as the user setting value or the default setting value. Based on the ejection amount, the ejection speed, or the ejection angle, the selection unit 22 selects the second liquid ejecting head and the third liquid ejecting head in the same manner as done in the case of ink viscosity.

When ink-droplet stability is used as ejection characteristics information, the selection unit 22 selects, as the first liquid ejecting head from among the plurality of heads 10, a liquid ejecting head whose ink droplet in a captured image as pieces of ejection characteristics information has the most isotropic shape. If an ink droplet has an isotropic shape, the ink droplet is stable and is thus less susceptible to dot-shape deformation at the time of landing onto a surface of a medium.

The selection unit 22 may select, as the first liquid ejecting head from among the plurality of heads 10, a liquid ejecting head for which the shape of an ink droplet in a captured image obtained as pieces of ejection characteristics information is closest to the shape of an ink droplet in a captured image set as the user setting value or the default setting value. The selection unit 22 may select, as the second liquid ejecting head from among the plurality of heads 10, a liquid ejecting head for which the difference between the shape of an ink droplet in a captured image obtained as pieces of ejection characteristics information and the shape of an ink droplet in a captured image set as the user setting value or the default setting value is within a predetermined range. The selection unit 22 may select, as the third liquid ejecting head from among the plurality of heads 10, a liquid ejecting head for which this difference is not within the predetermined range. The comparison of the shape of the ink droplet in the captured image therewith can be performed by using a known image processing method.

There are various kinds of ejection characteristics information such as an ejection amount of an ink droplet. When plural kinds of ejection characteristics information are acquired for each head 10, the selection unit 22 selects the first liquid ejecting head, the second liquid ejecting head, and the third liquid ejecting head for each of these kinds of ejection characteristics information. For example, the selection unit 22 may select the head 10A as the first liquid ejecting head with regard to an ejection amount and may select the head 10B as the first liquid ejecting head with regard to an ejection speed. As another example, the selection unit 22 may calculate one evaluation value from plural kinds of ejection characteristics information for each head 10 and select the first liquid ejecting head, the second liquid ejecting head, and the third liquid ejecting head based on the evaluation values.

The server program 20 including the selection unit 22 described above transmits, to the tablet 3 (the client program 30) via the communication unit 21, information as to which of the plurality of head 10 have been selected as the first liquid ejecting head, the second liquid ejecting head, and the third liquid ejecting head.

The client program 30 is a program that causes the tablet 3 to operate as an input processing unit 35, an instruction unit 36, a characteristics transmission unit 37, and a notification unit 38.

When the user operates a GUI component displayed on the touch panel 31, the input processing unit 35 performs processing for execution of a function that corresponds to the user operation. A specific explanation of the user operation and the function will be given later.

The instruction unit 36 transmits an instruction for causing the head 10 to eject ink to the experiment device 5. Specifically, the instruction unit 36 transmits, to the experiment device 5, a designation of the head 10A or the head 10B as the head from which ink should be ejected from among the plurality of heads 10 coupled to the experiment device 5, a designation of a drive signal to be applied to the piezoelectric actuators PZq, and print data. The designation of the head 10 and the drive signal is performed by the user via the input processing unit 35 as will be described later.

When the instruction is given to the experiment device 5 by the instruction unit 36, based on the instruction, the experiment device 5 causes the designated head 10 to eject ink by means of the designated drive signal so as to print the print data.

The characteristics transmission unit 37 acquires ejection characteristics information from the experiment device 5 and transmits it to the server 2 (the server program 20) by using the communication unit 32. In the present embodiment, the characteristics transmission unit 37 displays a GUI component for asking for the user's approval to transmit the ejection characteristics information to the server 2 on the touch panel 31, and transmits the ejection characteristics information to the server 2 if a user operation indicating the approval is received via the input processing unit 35. Of course, the ejection characteristics information may be transmitted to the server 2 without asking for such an approval.

The notification unit 38 receives information regarding the first liquid ejecting head from the server 2 via the communication unit 32, and notifies the user of the information regarding the first liquid ejecting head. Moreover, the notification unit 38 notifies the user of information regarding the second liquid ejecting head and information regarding the third liquid ejecting head. The information regarding the first liquid ejecting head, the information regarding the second liquid ejecting head, and the information regarding the third liquid ejecting head will be hereinafter referred to as "selection result information".

The selection result information is information that, at least, indicates which of the plurality of heads 10 having been caused to eject ink by the experiment device 5 is the first liquid ejecting head, the second liquid ejecting head, or the third liquid ejecting head.

The selection result information may contain the ejection characteristics information itself regarding the head 10 selected as the first liquid ejecting head, the second liquid ejecting head, or the third liquid ejecting head, the drive signal having been used, information that indicates how much the ejection characteristics information is deviated from the user setting value or the default setting value, information about comparison with the ejection characteristics information of another head 10, and the like.

The notification unit 38 notifies the user of such selection result information. Specifically, the notification unit 38 generates an image that represents the selection result information and causes the touch panel 31 to display it. With the notification unit 38 described above, it is possible to notify the user of the selection result information.

The configuration of the notification unit 38 is not limited to a configuration of notifying the user of the selection result information through the user's visual perception by displaying an image as described above. For example, the notification unit 38 may notify the user of the selection result information through the user's aural perception by generating a voice message, etc. of reading aloud the selection result information and then outputting it to speakers of the tablet 3. The means for notification is not limited to hardware such as the touch panel 31 or the speakers of the tablet 3; for example, the notification unit 38 may notify the user of the selection result information by using an information communication means such as an electronic mail.

With reference to FIGS. 14 to 20, a flow of processing performed in the system 1 will now be explained. In this example, in a first test ejection, a head 10A1 and a head 10B1 are coupled to the connector 51A and the connector 51B respectively, and ink is ejected from them. In a second test ejection, a head 10A2 and a head 10B2 are coupled to the connector 51A and the connector 51B respectively, and ink is ejected from them.

Figure 15:
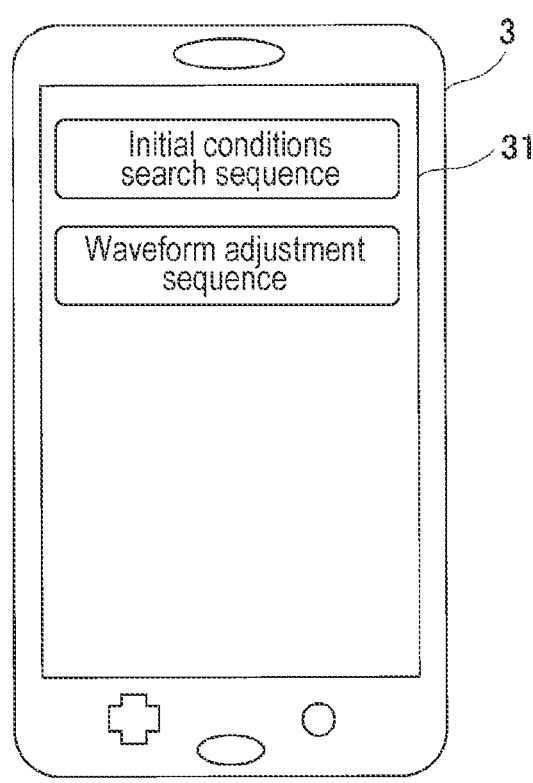
FIG. 15 is a diagram illustrating a screen displayed on a tablet.

FIG. 15 depicts that an image generated by the client program 30 is displayed on the touch panel 31 of the tablet 3. The image shows menus for calling up functions provided in the client program 30.

The input processing unit 35 calls up a head selection function when a menu "initial conditions search sequence" is selected by the user.

Figure 16:
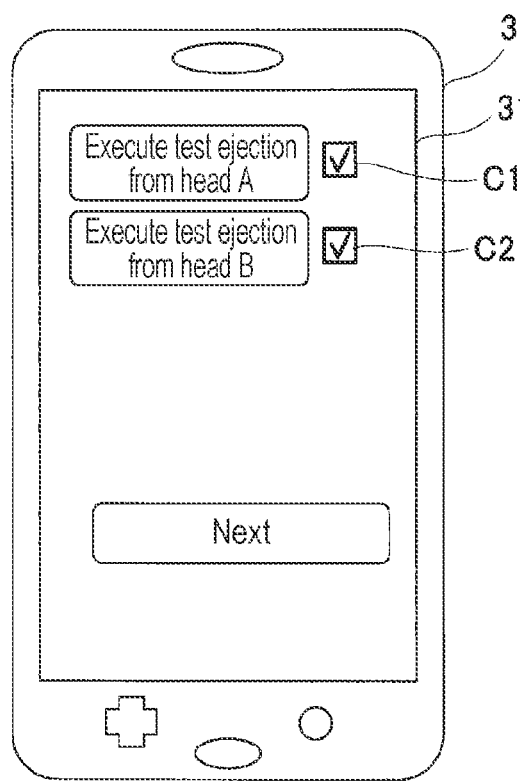
FIG. 16 is a diagram illustrating a screen displayed on the tablet.

As illustrated in FIG. 16, a head selection image generated by the head selection function is displayed on the touch panel 31. In the first test ejection, the "head A" illustrated in FIG. 16 means the head 10A1 coupled to the connector 51A. In the second test ejection, the "head A" illustrated in FIG. 16 means the head 10A2 coupled to the connector 51A. Similarly, in the first test ejection, the "head B" means the head 10B1 coupled to the connector 51B, and, in the second test ejection, the "head B" means the head 10B2 coupled to the connector 51B. On the head selection image, a checkbox C1 for selecting the head A coupled to the connector 51A and a checkbox C2 for selecting the head B coupled to the connector 51B are displayed.

When the user ticks both the checkbox C1 and the checkbox C2 and then selects a "Proceed to the next" button, the input processing unit 35 calls up an ejection confirmation function.

Figure 17:
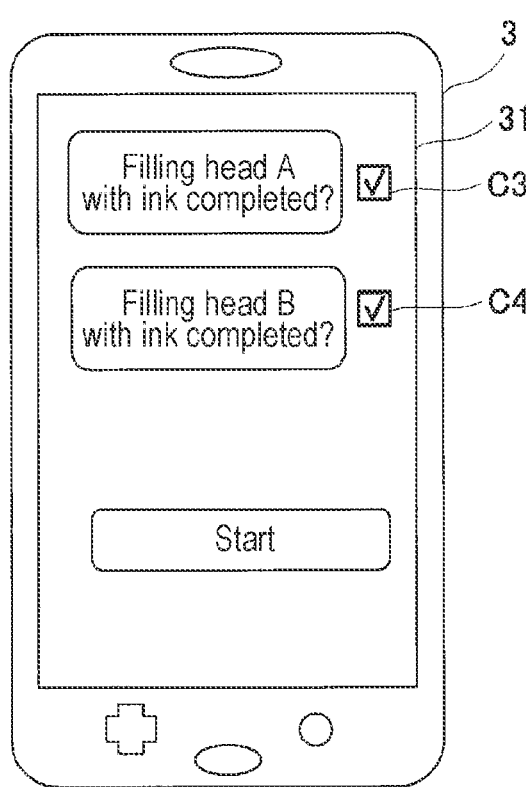
FIG. 17 is a diagram illustrating a screen displayed on the tablet.

As illustrated in FIG. 17, an ejection confirmation image generated by the ejection confirmation function is displayed on the touch panel 31. On the ejection confirmation image, a checkbox C3 to be ticked upon confirming that the head A coupled to the connector 51A has been filled with ink and checkbox C4 to be ticked upon confirming that the head B coupled to the connector 51B has been filled with ink are displayed.

When the user ticks both the checkbox C3 and the checkbox C4 and then selects a "Start" button (step S1 in FIG. 14), the input processing unit 35 causes the instruction unit 36 to perform processing for causing the head A with the tick mark in the checkbox C3 and the head B with the tick mark in the checkbox C4 to eject ink.

Figure 14:
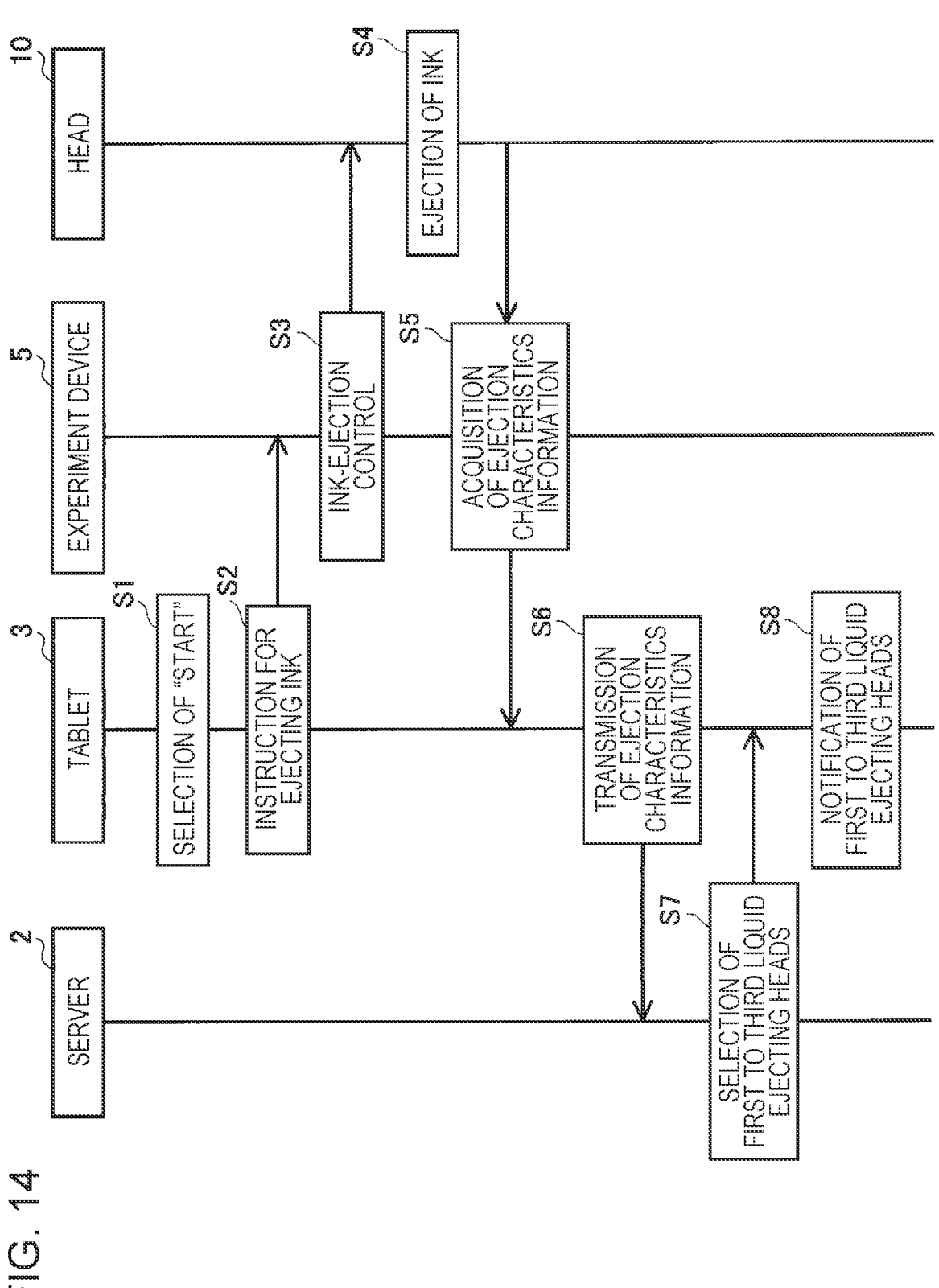
FIG. 14 is a diagram for explaining a flow of processing performed in the system according to the first embodiment.

The instruction unit 36 gives, to the experiment device 5, an instruction for causing the head A and the head B having been ticked by the user through the input processing unit 35 to eject ink (step S2 in FIG. 14). If there are plural drive signals, though not illustrated, a function for asking the user to select a drive signal may be executed. Then, the input processing unit 35 may acquire the drive signal selected by the user as asked by this function, and the instruction unit 36 may instruct the experiment device 5 that ink should be ejected by means of the selected drive signal. In a case where the user is not asked to select a drive signal, the instruction unit 36 transmits a drive signal having been determined in advance to the experiment device 5.

Based on the instruction given by the instruction unit 36, the experiment device 5 performs ink ejection control (step S3 in FIG. 14). In the ink ejection control, as described above, the head A and the head B are caused to eject ink by using the drive signal designated by the user or by using the drive signal having been determined in advance.

Based on the drive signal supplied from the experiment device 5, the head A and the head B eject ink (step S4 in FIG. 14). When ink ejection is completed, residual vibration occurs.

The experiment device 5 acquires ejection characteristics information from an electric signal that corresponds to residual vibration after ink ejection (step S5 in FIG. 14).

Figure 18:
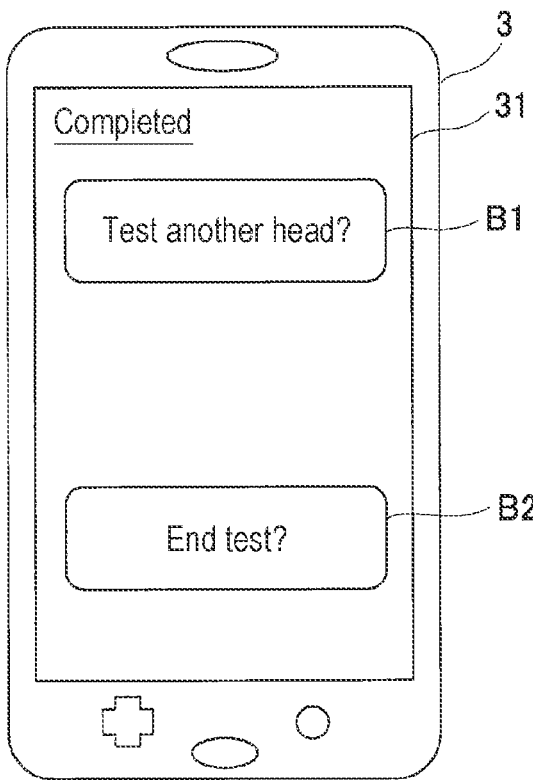
FIG. 18 is a diagram illustrating a screen displayed on the tablet.

The tablet 3 acquires ejection characteristics information from the experiment device 5 in this way, and the first test ejection finishes. After the completion of the first test ejection, the client program 30 calls up a continuation confirmation function. As illustrated in FIG. 18, a continuation confirmation image generated by the continuation confirmation function is displayed on the touch panel 31. On the continuation confirmation image, a button B1 for executing the next test ejection, that is, a second test ejection, and a button B2 for terminating the test process are displayed.

When the user selects the button B1, the user attaches the head 10A2 and the head 10B2 to the experiment device 5 and instructs that, as the second test ejection, processing in the steps S1 to S5 illustrated in FIGS. 16 and 17 be executed. As the result of executing the second test ejection, ejection characteristics information shown in Table 2 are obtained. Both a drive signal S10 and a drive signal S11 are drive signals having been determined in advance. The ejection characteristics information is ink viscosity based on residual vibration.

TABLE 2

| | Ejection characteristics information, Ink viscosity | Drive signal |
|---|---|---|
| Head 10A1 | 100 | Drive signal S10 |
| Head 10A2 | 110 | Drive signal S10 |
| Head 10B1 | 105 | Drive signal S11 |
| Head 10B2 | 120 | Drive signal S11 |

When plural drive signals different for each head 10 are applied thereto, as shown in Table 3, ejection characteristics information can be obtained for each head and for each drive signal. Each of drive signals S1 to S4 is a drive signal selected by the user from among a plurality of drive signals.

TABLE 3

| | Ejection characteristics information, Ink viscosity | Drive signal |
|---|---|---|
| Head 10A1 | 100 | Drive signal S1 |
| Head 10A1 | 102 | Drive signal S2 |
| Head 10A2 | 110 | Drive signal S1 |
| Head 10A2 | 113 | Drive signal S2 |
| Head 10B1 | 120 | Drive signal S3 |
| Head 10B1 | 125 | Drive signal S4 |
| Head 10B2 | 105 | Drive signal S3 |
| Head 10B2 | 108 | Drive signal S4 |

When the user selects the button B2 after finishing the second test ejection, the input processing unit 35 calls up a result confirmation function.

Figure 19:
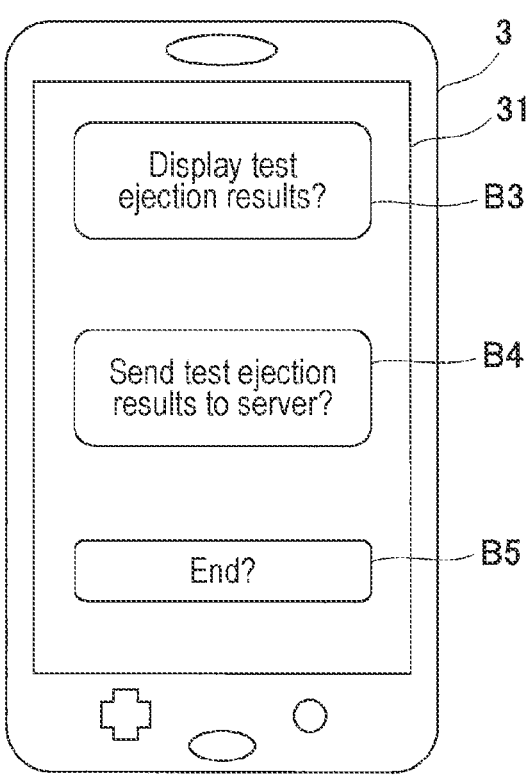
FIG. 19 is a diagram illustrating a screen displayed on the tablet.

As illustrated in FIG. 19, a result confirmation image generated by the result confirmation function is displayed on the touch panel 31. On the result confirmation image, a button B3 for displaying test ejection results, that is, ejection characteristics information, a button B4 for transmitting the test ejection results to the server 2, and an end button B5 are displayed.

When the user selects the button B3, the input processing unit 35 calls up a function for displaying ejection characteristics information. This function causes the touch panel 31 to display the ejection characteristics information obtained from the heads 10, though not illustrated. After confirming the ejection characteristics information, if the user wants to terminate the display and return from this function to the screen illustrated in FIG. 19, the user can do so by selecting the end button B5. The execution of the client program 30 is ended when the end button B5 is selected.

When the user selects the button B4, the input processing unit 35 causes the characteristics transmission unit 37 to perform processing. That is, the characteristics transmission unit 37 transmits the ejection characteristics information acquired as shown in Table 2 or Table 3 to the server 2 (step S6 in FIG. 14).

At the server 2, based on the ejection characteristics information, the selection unit 22 selects the first to third liquid ejecting heads (step S7 in FIG. 14). An example of the selection results is shown in Table 4,

TABLE 4

| | Ejection characteristics information, Ink viscosity | Selection results | Drive signal |
|---|---|---|---|
| Head 10A1 | 100 | First liquid ejecting head | Drive signal S10 |
| Head 10A2 | 110 | Second liquid ejecting head | Drive signal S10 |
| Head 10B1 | 105 | Second liquid ejecting head | Drive signal S11 |
| Head 10B2 | 120 | Third liquid ejecting head | Drive signal S11 |

When plural drive signals different for each head 10 were applied thereto, as shown in Table 5, in addition to the first to third liquid ejecting heads, the drive signals that were used for obtaining the ejection characteristics information are also included.

TABLE 5

| | Ejection characteristics information, Ink viscosity | Selection results | Drive signal |
|---|---|---|---|
| Head 10A1 | 100 | First liquid ejecting head | Drive signal S1 |
| Head 10A1 | 102 | Second liquid ejecting head | Drive signal S2 |
| Head 10A2 | 110 | Second liquid ejecting head | Drive signal S1 |
| Head 10A2 | 113 | Third liquid ejecting head | Drive signal S2 |
| Head 10B1 | 120 | Third liquid ejecting head | Drive signal S3 |
| Head 10B1 | 125 | Third liquid ejecting head | Drive signal S4 |
| Head 10B2 | 105 | Second liquid ejecting head | Drive signal S3 |
| Head 10B2 | 108 | Second liquid ejecting head | Drive signal S4 |

The server 2 transmits the selection results to the tablet 3. At the tablet 3, the notification unit 38 notifies the user of the selection results (step S8 in FIG. 14).

Figure 20:
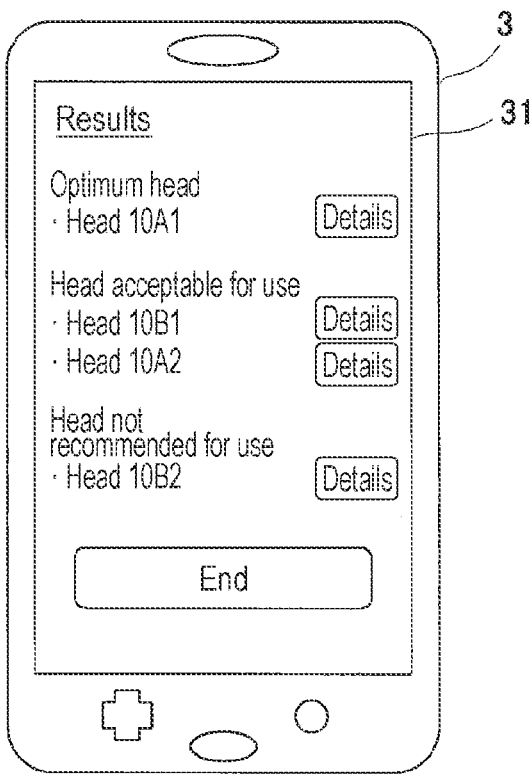
FIG. 20 is a diagram illustrating a screen displayed on the tablet.

An image generated by the notification unit 38 is illustrated in FIG. 20. In FIG. 20, "Head 10A1" is displayed as "Optimum head" (first liquid ejecting head), "Head 10B1" and "Head 10A2" are displayed as "Head acceptable for use" (second liquid ejecting head), and "Head 10B2" is displayed as "Head not recommended for use" (third liquid ejecting head).

When plural drive signals different for each head 10 were applied thereto, though not illustrated, for each of the plurality of heads 10, the notification unit 38 may notify the user of which of the first to third liquid ejecting heads it corresponds to and which of the drive signals was used.

The system 1 according to the present embodiment described above includes the characteristics acquisition unit 67 that acquires pieces of ejection characteristics information regarding ejection characteristics of the plurality of heads 10 different from one another, the selection unit 22 that selects a first liquid ejecting head from among the plurality of heads 10 based on the pieces of ejection characteristics information, and the notification unit 38 that notifies a user of information regarding the first liquid ejecting head.

With the system 1 having the above configuration, the user is able to obtain pieces of ejection characteristics information of the plurality of heads 10 different from one another and is able to easily know the first liquid ejecting head selected from among the plurality of heads 10 based on the ejection characteristics information. Since the user is able to know which of the plurality of heads 10 the first liquid ejecting head is, it is possible to avoid making a request to the head manufacturer for supply of another head. In this way, just with a simple method, the system 1 makes it possible to provide an appropriate head to the user without burdening the user.

The user may actually use the head 10A, 10B having been selected as the first liquid ejecting head or the second liquid ejecting head on a printer, etc. on an as-is basis. Alternatively, in response to a request made by the user, the head manufacturer may supply a head of the same model as the head 10A, 10B to the user. That is, the head 10 used on the experiment device 5 may be a sample liquid ejecting head for an experiment. By using the sample liquid ejecting head for an experiment, the user is able to test and judge whether the liquid ejecting head under the experiment is the expected one or not. As described above, using such a sample liquid ejecting head for an experiment makes it unnecessary to use a non-sample liquid ejecting head to conduct the experiment and therefore makes it possible to reduce the overall cost of the experiment.

Though it has been described that the selection unit 22 selects the first liquid ejecting head, the second liquid ejecting head, and the third liquid ejecting head, the scope of the present disclosure is not limited thereto. Selecting at least the first liquid ejecting head suffices. The second liquid ejecting head and the third liquid ejecting head do not necessarily have to be selected. It has been described that each of the head 10A, the head 10B, and the head 10C is a circulation-type liquid ejecting head to which ink is supplied from the ink supply device 4 and from which ink is drained to the ink supply device 4. However, the scope of application of the system 1 is not limited to a plurality of circulation-type liquid ejecting heads. The system 1 may be applied to non-circulation-type liquid ejecting heads to which ink is supplied from the ink supply device 4. Of course, the system 1 may be applied to a hybrid mixture of liquid ejecting heads including both the circulation type and the non-circulation type.

In the system 1 according to the present embodiment, the ejection characteristics include an ejection amount of ink ejected from the head 10. With the system 1 having this configuration, the user is able to know the first liquid ejecting head selected based on the ejection amount.

In the system 1 according to the present embodiment, the ejection characteristics include an ejection speed of ink ejected from the head 10. With the system 1 having this configuration, the user is able to know the first liquid ejecting head selected based on the ejection speed.

In the system 1 according to the present embodiment, the ejection characteristics include a parameter obtained from residual vibration after driving the piezoelectric actuator. With the system 1 having this configuration, the user is able to know the first liquid ejecting head selected based on various parameters such as raw data of residual vibration or ink viscosity obtained from raw data of residual vibration.

In the system 1 according to the present embodiment, the first liquid ejecting head is a liquid ejecting head that has the best ejection characteristics among the plurality of heads 10. With the system 1 having this configuration, the user is able to know the head 10 corresponding to the first liquid ejecting head having the best ejection characteristics among the plurality of heads 10. The first liquid ejecting head having the best ejection characteristics is selected based on the absolute standard or the relative standard described above. In particular, when the relative standard is adopted, the user is able to know which of the plurality of heads 10 is closest to the desired specification.

In the system 1 according to the present embodiment, the selection unit 22 further selects the second liquid ejecting head from among the plurality of heads 10. The second liquid ejecting head is a liquid ejecting head(s) whose ejection characteristics are inferior to the ejection characteristics of the first liquid ejecting head but satisfy tolerance conditions among the plurality of heads 10. With the system 1 having this configuration, the user is able to know which of the plurality of heads 10 satisfies the desired specification, although it is not closest to the desired specification.

In the system 1 according to the present embodiment, the selection unit 22 further selects the third liquid ejecting head from among the plurality of heads 10. The third liquid ejecting head is a liquid ejecting head(s) that does not satisfy the tolerance conditions among the plurality of heads 10. With the system 1 having this configuration, the user is able to know which of the plurality of heads 10 does not satisfy the desired specification.

In the head 10A, one pressure compartment CB1 and one pressure compartment CB2, two in total, are provided for each one nozzle N. In the head 10B, one pressure compartment CB1 is provided for each one nozzle N1, and one pressure compartment CB2 is provided for each one nozzle N2. That is, in the head 10B, one pressure compartment is provided for each one nozzle. In the head 10C, two pressure compartments CB1 and two pressure compartments CB2, four in total, are provided for each one nozzle N. As described above, the system 1 according to the present embodiment can be applied to, as a plurality of liquid ejecting heads different from one another, heads different from one another in terms of the number of pressure compartments that are in communication with one nozzle.

In the system 1 according to the present embodiment, the characteristics acquisition unit 67 acquires pieces of ejection characteristics information regarding ejection characteristics obtained when ink is ejected by applying a plurality of drive signals to the piezoelectric actuator PZq provided in each of the plurality of heads 10. With the system 1 having this configuration, as shown in Table 5, for each of the plurality of heads 10 and for each of the plurality of drive signals, the user is able to know which of the first to third liquid ejecting heads the head corresponds to.

Although a plurality of drive signals having been stored in the tablet 3 in advance may be used, the drive signals may be created by the user on the tablet 3. That is, the client program may operate as a means for creation of drive signals on the tablet 3.

The system 1 according to the present embodiment includes the plurality of heads 10, the experiment device 5 to which the plurality of heads 10 is configured to be coupled, the tablet 3 configured to communicate with the experiment device 5, and the server 2 configured to communicate with the tablet 3. The tablet 3 includes the notification unit 38, and the touch panel 31 as a display unit configured to perform display for notification by the notification unit 38. The server 2 includes the selection unit 22.

With the system 1 having the above configuration, the administrator of the system 1 is able to provide the following service to users: the administrator administers the server 2 and provides the heads 10, the experiment device 5, and the client program 30 to the user; when the user operates the experiment device 5 via the tablet 3, the head 10 corresponding to the first liquid ejecting head, the head(s) 10 corresponding to the second liquid ejecting head, and the head(s) 10 corresponding to the third liquid ejecting head are notified to the user.

The experiment device 5 of the system 1 according to the present embodiment includes the connector 51A to which a part of the plurality of heads 10 is configured to be coupled, and the connector 51B to which another part of the plurality of heads 10 is configured to be coupled. Since the experiment device 5 has this configuration, the head 10A and the head 10B that are different from each other can be coupled to the connector 51A and the connector 51B respectively.

Though it has been described that the experiment device 5 is provided with the connector 51A and the connector 51B, the number of connectors is not limited to two. The experiment device 5 may be provided with a single connector, or two or more connectors.

In the system 1 according to the present embodiment, the connector 51A and the connector 51B are different in shape from each other. Since the experiment device 5 has this configuration, even if the shapes of members to be coupled to the experiment device 5 are different from each other, specifically, in the above embodiment, even though the shape of the wiring substrate 200B is different from the shape of the wiring substrate 200A, the head 10A and the head 10B that are different from each other can be coupled to the connector 51A and the connector 51B respectively.

Though it has been described that the connector 51A and the connector 51B of the experiment device 5 are different in shape from each other, the scope of the present disclosure is not limited thereto. They may have the same shape.

The experiment device 5 of the system 1 according to the present embodiment includes the first drive circuit 60 serving as a common drive circuit configured to drive the plurality of heads 10. With the system 1 having this configuration, since there is no need to provide a drive circuit individually for each of the plurality of heads 10, it is possible to simply the configuration of the experiment device 5 and thus reduce cost.

Though it has been described that the experiment device 5 includes the first drive circuit 60 serving as a common drive circuit configured to drive the plurality of heads 10, the scope of the present disclosure is not limited thereto. That is, the experiment device 5 may include a plurality of drive circuits configured to drive the plurality of heads 10 individually.

The server 2 according to the present embodiment is a server configured to receive, from the tablet 3, pieces of ejection characteristics information regarding ejection characteristics of the plurality of heads 10 different from one another. The server includes the selection unit 22 that selects, based on the pieces of ejection characteristics information acquired from the tablet 3, the first to third liquid ejecting heads from among the plurality of heads 10.

With the server 2 having the above configuration, it is possible to perform processing at the server 2 collectively for a plurality of sets each comprising the tablet 3 possessed by the user and the experiment device 5. Therefore, it is unnecessary to provide the selection units 22 corresponding to the number of the tablets 3 and the experiment devices 5.

Moreover, at the server 2, it is possible to accumulate ejection characteristics information having been sent from each user. It is possible to process the ejection characteristics information having been accumulated in this way to obtain processed data that is to be used as a basis for selection by the selection unit 22 and then use the processed data for selection of the first to third liquid ejecting heads by the selection unit 22. For example, calculation of various kinds of amount of statistics such as average, variance, and standard deviation is performed for each head and for each drive signal on the ejection characteristics information having been acquired from each user. Then, it is possible to select one for which the ejection characteristics information having been sent from the user is closest to the average of the values as the first liquid ejecting head, select one/those for which the ejection characteristics information having been sent from the user is within a range of $\pm 2\sigma$ (where $\sigma$ denotes standard deviation) from the average as the second liquid ejecting head, and select one/those for which the ejection characteristics information having been sent from the user is not within the range of $\pm 2\sigma$ therefrom as the third liquid ejecting head.

The tablet 3 according to the present embodiment is configured to communicate with the experiment device 5, to which the plurality of heads 10 different from one another is configured to be coupled and which acquires pieces of ejection characteristics information regarding ejection characteristics of the plurality of heads 10, and with the server 2 configured to select the first to third liquid ejecting heads from among the plurality of heads 10. The tablet 3 according to the present embodiment includes the characteristics transmission unit 37, which transmits the pieces of ejection characteristics information acquired from the experiment device 5 to the server 2, and the notification unit 38, which notifies the user of information acquired from the server 2 regarding the first to third liquid ejecting heads.

With the tablet 3 having the above configuration, the user is able to instruct the head 10 to eject ink via the experiment device 5 by operating the general-purpose tablet 3.

In the above embodiment, the selection unit 22 is provided in the server 2; however, the scope of the present disclosure is not limited thereto. The selection unit may be provided in the tablet 3. That is, the tablet 3 may select the first to third liquid ejecting heads based on the ejection characteristics information, without using the server 2.

The experiment device 5 according to the present embodiment is configured such that the plurality of heads 10 different from one another is to be coupled thereto, configured to communicate with the tablet 3, configured to cause the plurality of heads 10 to eject a liquid in accordance with an instruction given from the tablet 3, and includes the characteristics acquisition unit 67 that acquires pieces of ejection characteristics information regarding ejection characteristics of the plurality of heads 10.

With the experiment device 5 having the above configuration, it is possible to cause the plurality of heads 10 different from one another to eject ink and thereby obtain the pieces of ejection characteristics information.

In the above embodiment, the selection unit 22 is provided in the server 2, and the notification unit 38 is provided in the tablet 3; however, the scope of the present disclosure is not limited thereto. The selection unit 22 and the notification unit 38 may be provided in the experiment device 5. That is, the experiment device 5 may select the first to third liquid ejecting heads based on the ejection characteristics information without using the server 2 and the tablet 3 and then notify the user of the results by displaying the results on a display, etc.

The server program 20 according to the present embodiment causes the server 2 to operate as the selection unit 22. The server 2 is configured to receive pieces of ejection characteristics information regarding ejection characteristics of the plurality of heads 10 different from one another from the tablet 3. The selection unit 22 is an example of a selector that selects, based on the pieces of ejection characteristics information acquired from the tablet 3, the first to third liquid ejecting heads from among the plurality of heads 10.

With the server program 20 described above, it is possible to cause the server 2 to perform processing collectively for a plurality of sets each comprising the tablet 3 possessed by the user and the experiment device 5.

The client program 30 according to the present embodiment causes the tablet 3 to operate as the characteristics transmission unit 37 and the notification unit 38. The tablet 30 is configured to communicate with the experiment device 5, to which the plurality of heads 10 different from one another is configured to be coupled and which acquires pieces of ejection characteristics information regarding ejection characteristics of the plurality of heads 10, and with the server 2 configured to select the first to third liquid ejecting heads from among the plurality of heads 10. The characteristics transmission unit 37 is an example of a characteristics transmitter that transmits the pieces of ejection characteristics information acquired from the experiment device 5 to the server 2. The notification unit 38 is an example of a notifier that notifies the user of information acquired from the server 2 regarding the first to third liquid ejecting heads.

With the client program 30 described above, it is possible to realize giving an instruction for causing the head 10 to eject ink via the experiment device 5 by operating the general-purpose tablet 3.

In the above embodiment, the selection unit 22 is provided in the server program 20; however, the scope of the present disclosure is not limited thereto. A selector corresponding to the selection unit 22 may be provided in the client program 30. That is, the client program 30 may select the first to third liquid ejecting heads based on the ejection characteristics information, without using the server program 20.

Second Embodiment

In the system 1 according to the first embodiment, the head 10A, the head 10B, and the head 10C, among which there is a difference in the number of pressure compartments CB provided for each one nozzle N, have been taken as an example of the plurality of heads 10 different from one another. However, the difference among the plurality of heads 10 different from one another is not limited to the foregoing example.

For example, as a plurality of liquid ejecting heads different from one another, the disclosed technique may be applied to heads different from one another in terms of the drive force of the piezoelectric actuator PZq provided correspondingly to one pressure compartment CB.

As another example, as a plurality of liquid ejecting heads different from one another, the disclosed technique may be applied to heads different from one another in terms of the diameter of the nozzle N provided correspondingly to one pressure compartment CB.

Third Embodiment

Though the characteristics acquisition unit 67 according to the first embodiment is embodied as a part of the first drive circuit 60, the scope of the present disclosure is not limited thereto. The characteristics acquisition unit 67 may be a part of an experiment-device program to be run by the control processing unit 64.

That is, the experiment-device program causes the experiment device 5, which is configured such that the plurality of heads 10 different from one another is to be coupled thereto and configured to communicate with the tablet 3, to operate as the characteristics acquisition unit that is an example of a characteristics acquirer to acquire pieces of ejection characteristics information regarding ejection characteristics of the plurality of heads 10 by causing the plurality of heads 10 to eject ink in accordance with an instruction given from the tablet 3.

In the first embodiment, the selection unit 22 is provided in the server program 20, and the notification unit 38 is provided in the client program 30; however, the scope of the present disclosure is not limited thereto. A selector corresponding to the selection unit 22 and a notifier corresponding to the notification unit 38 may be provided in the experiment-device program. That is, the experiment-device program may select the first to third liquid ejecting heads based on the ejection characteristics information without using the server program 20 and the client program 30 and then notify the user of the results by displaying the results on a display, etc. provided on the experiment device.

Fourth Embodiment

In the foregoing embodiment, the selection unit 22 selects the first liquid ejecting head, the second liquid ejecting head, and the third liquid ejecting head. However, the scope of the present disclosure is not limited thereto.

That is, a system according to the present embodiment includes a characteristics acquisition unit that acquires ejection characteristics information regarding ejection characteristics of a liquid ejecting head, a selector that selects a liquid ejecting head that satisfies tolerance conditions based on the ejection characteristics information acquired by the characteristics acquisition unit, and a notifier that notifies a user of the selected liquid ejecting head. The "liquid ejecting head that satisfies tolerance conditions" mentioned here is the second liquid ejecting head described in the first embodiment.

In the system according to the present embodiment, a plurality of liquid ejecting heads is not always necessary, meaning that the system determines, for each of one or more liquid ejecting heads, whether it satisfies the tolerance conditions or not. By this means, it is possible to notify the user of whether one or more liquid ejecting heads satisfy the tolerance conditions or not.

Other Embodiments

In the foregoing embodiments, an ink-jet recording head has been taken as an example of a liquid ejecting head. However, the present disclosure is directed to a wide variety of liquid ejecting heads and thus can be applied to not only a liquid ejecting head that ejects ink but also a liquid ejecting head that ejects a liquid other than ink. Some examples of other kind of liquid ejecting head are: various recording heads used in an image recording apparatus such as a printer or the like, a color material ejection head used in color filter production for a liquid crystal display device or the like, an electrode material ejection head used for forming electrodes of an organic EL display device, an FED (field emission display) device, or the like, and a living organic material ejection head used for production of biochips. The present disclosure can be applied to a liquid ejecting apparatus equipped with such a liquid ejecting head.

In the foregoing embodiments, a piezoelectric actuator has been described as an example of a drive element that causes pressure changes in a pressure compartment. However, the scope of the present disclosure is not limited thereto. For example, as a drive element, a heating element may be disposed inside a pressure compartment, an ink droplet may be ejected from a nozzle by means of bubbles produced due to the heat of the heating element. Alternatively, a so-called electrostatic actuator, which generates static electricity between a diaphragm and an electrode and causes deformation of the diaphragm by utilizing a static force to eject an ink droplet from a nozzle, may be used as a drive element.

What is claimed is:

1. A system, comprising:
a characteristics acquirer that acquires pieces of ejection characteristics information regarding ejection characteristics of a plurality of liquid ejecting heads different from one another;
a selector that selects a first liquid ejecting head from among the plurality of liquid ejecting heads based on the pieces of ejection characteristics information,
a notifier that notifies a user of information regarding the first liquid ejecting head;
the plurality of liquid ejecting heads;
an experiment device to which the plurality of liquid ejecting heads is configured to be coupled;
an external device configured to communicate with the experiment device; and
a server configured to communicate with the external device, wherein
the external device includes
the notifier, and
a display unit configured to perform display for notification by the notifier, and the server includes the selector.

2. The system according to claim 1, wherein
the ejection characteristics include an ejection amount of a liquid ejected from the liquid ejecting head.

3. The system according to claim 1, wherein
the ejection characteristics include an ejection speed of a liquid ejected from the liquid ejecting head.

4. The system according to claim 1, wherein
each of the plurality of liquid ejecting heads includes
a pressure compartment;
a diaphragm; and
a piezoelectric element that applies pressure to a liquid present inside the pressure compartment by causing the diaphragm to vibrate, and
the ejection characteristics include a parameter obtained from residual vibration after driving the piezoelectric element.

5. The system according to claim 1, wherein
the first liquid ejecting head is a liquid ejecting head that has best ejection characteristics among the plurality of liquid ejecting heads.

6. The system according to claim 1, wherein
the selector further selects a second liquid ejecting head from among the plurality of liquid ejecting heads,
the notifier further notifies the user of information regarding the second liquid ejecting head, and
the second liquid ejecting head is a liquid ejecting head whose ejection characteristics are inferior to the ejection characteristics of the first liquid ejecting head but satisfy tolerance conditions among the plurality of liquid ejecting heads.

7. The system according to claim 6, wherein
the selector further selects a third liquid ejecting head from among the plurality of liquid ejecting heads,
the notifier further notifies the user of information regarding the third liquid ejecting head, and
the third liquid ejecting head is a liquid ejecting head whose ejection characteristics do not satisfy the tolerance conditions among the plurality of liquid ejecting heads.

8. The system according to claim 1, wherein
each of the plurality of liquid ejecting heads includes
a pressure compartment;
a diaphragm; and
a drive element that applies pressure to a liquid present inside the pressure compartment by causing the diaphragm to vibrate, and
the plurality of liquid ejecting heads are different from one another in terms of drive force of the drive element provided correspondingly to one the pressure compartment.

9. The system according to claim 1, wherein
each of the plurality of liquid ejecting heads includes
a pressure compartment; and
a nozzle provided correspondingly to the pressure compartment, and
the plurality of liquid ejecting heads are different from one another in terms of diameter of the nozzle provided correspondingly to one the pressure compartment.

10. The system according to claim 1, wherein
each of the plurality of liquid ejecting heads includes
a pressure compartment; and
a nozzle provided correspondingly to the pressure compartment, and
the plurality of liquid ejecting heads are different from one another in terms of a number of the pressure compartments that are in communication with one the nozzle.

11. The system according to claim 1, wherein
the characteristics acquirer acquires the pieces of ejection characteristics information regarding the ejection characteristics obtained when a liquid is ejected by applying a plurality of drive signals to a drive element provided in each of the plurality of liquid ejecting heads.

12. The system according to claim 1, wherein
the experiment device includes
a first connector to which a part of the plurality of liquid ejecting heads is configured to be coupled, and
a second connector to which another part of the plurality of liquid ejecting heads is configured to be coupled.

13. The system according to claim 12, wherein
a shape of the second connector is different from a shape of the first connector.

14. The system according to claim 1, wherein
the experiment device includes a common drive circuit configured to drive the plurality of liquid ejecting heads.

15. A non-transitory storage medium storing a client program configured to cause an external device to operate as a characteristics transmitter and a notifier, the external device being configured to communicate with an experiment device and a server, a plurality of liquid ejecting heads different from one another being configured to be coupled to the experiment device, the external device being configured to acquire pieces of ejection characteristics information regarding ejection characteristics of the plurality of liquid ejecting heads, the server being configured to communicate with the experiment device so as to select a first liquid ejecting head from among the plurality of liquid ejecting heads, the characteristics transmitter being configured to transmit the pieces of ejection characteristics information acquired from the experiment device to the server, the notifier being configured to notify a user of information acquired from the server regarding the first liquid ejecting head via a display unit of the external device configured to perform display for notification by the notifier.

\* \* \* \* \*